(12) United States Patent
Gupta et al.

(10) Patent No.: US 12,619,618 B1
(45) Date of Patent: May 5, 2026

(54) QUERY DEPENDENT THRESHOLD GENERATION FOR SEARCH RESULT FILTERING

(71) Applicant: eBay Inc., San Jose, CA (US)

(72) Inventors: Shreya Gupta, Santa Clara, CA (US); Nadia G Vase, Los Altos, CA (US); John Degenhardt, San Jose, CA (US)

(73) Assignee: eBay Inc., San Jose, CA (US)

( * ) Notice: Subject to any disclaimer, the term of this patent is extended or adjusted under 35 U.S.C. 154(b) by 4 days.

(21) Appl. No.: 18/986,647

(22) Filed: Dec. 18, 2024

(51) Int. Cl.
G06F 16/2457 (2019.01)
G06F 16/248 (2019.01)

(52) U.S. Cl.
CPC ...... *G06F 16/24578* (2019.01); *G06F 16/248* (2019.01)

(58) Field of Classification Search
None
See application file for complete search history.

(56) References Cited

U.S. PATENT DOCUMENTS

| | | | | |
|---|---|---|---|---|
| 11,321,334 | B2 * | 5/2022 | Lam | G06F 16/951 |
| 11,681,713 | B2 | 6/2023 | Duzhik et al. | |
| 2012/0166277 | A1 | 6/2012 | Gnanamani et al. | |
| 2017/0322984 | A1 * | 11/2017 | Lam | G06F 16/338 |
| 2018/0101617 | A1 | 4/2018 | Govindarajan et al. | |
| 2019/0334851 | A1 * | 10/2019 | Shi | H04L 51/52 |
| 2021/0256367 | A1 | 8/2021 | Mor et al. | |
| 2022/0245162 | A1 | 8/2022 | Wang et al. | |

| | | | | |
|---|---|---|---|---|
| 2022/0365939 | A1 | 11/2022 | Hornkwist et al. | |
| 2022/0398643 | A1 | 12/2022 | Sivakumar et al. | |
| 2023/0297581 | A1 | 9/2023 | Yin et al. | |
| 2023/0334055 | A1 * | 10/2023 | Das | G06F 16/24578 |
| 2024/0257175 | A1 * | 8/2024 | Saha | G06Q 30/0631 |
| 2025/0086189 | A1 * | 3/2025 | Boxell | G06F 16/248 |
| 2025/0123814 | A1 * | 4/2025 | Mcmorran | G06F 8/75 |
| 2025/0209510 | A1 * | 6/2025 | Subramanya | G06F 40/284 |
| 2025/0209544 | A1 * | 6/2025 | Kong | G06Q 50/01 |
| 2025/0217848 | A1 * | 7/2025 | Lagi | G06F 16/9538 |
| 2025/0217863 | A1 * | 7/2025 | Tunkelang | G06F 16/9535 |
| 2025/0278750 | A1 * | 9/2025 | Krothapalli | G06Q 30/0202 |
| 2025/0292309 | A1 * | 9/2025 | Joshi | G06Q 30/0643 |

(Continued)

OTHER PUBLICATIONS

About Learning Models with Multiple Query-Dependent Features (Year: 2013).*

(Continued)

*Primary Examiner* — Kim T Nguyen
(74) *Attorney, Agent, or Firm* — FIG. 1 Patents

(57) ABSTRACT

Query dependent threshold generation for search result filtering is described. In one or more implementations, a user query entered via a search platform is received, and in response, items are retrieved from a storage device based on the user query. Using a first machine learning model, relevance scores are generated for the items, and the relevance scores represent degrees of relevance of respective items with respect to the user query. Using a second machine learning model, a relevance threshold is generated for the user query based on one or more features of the user query. The items are filtered based on the relevance scores and the relevance threshold, and the filtered items are communicated over a network for display in a user interface of the search platform.

20 Claims, 10 Drawing Sheets

(56) References Cited

U.S. PATENT DOCUMENTS

2025/0370992 A1* 12/2025 Meteer ................. G06F 16/248
2025/0371014 A1* 12/2025 Soceanu ............... G06F 16/248

OTHER PUBLICATIONS

Accelerated Query Processing Via Similarity Score Prediction (Year: 2019).*
Ai, et al., "Learning a Deep Listwise Context Model for Ranking Refinement", In The 41st International ACM SIGIR Conference on Research Development in Information Retrieval (SIGIR '18). Association for Computing Machinery, New York, NY USA, 2018, pp. 135-144.
Carmel, et al., "Why Do People Buy Seemingly Irrelevant Items in Voice Product Search?", In Proceedings of the 13th International Conference on Web Search and Data Mining, [retrieved from the internet on Mar. 13, 2025], <https://assets.amazon.science/f7/48/0562b2c14338a0b76ccf4f523fa5/why-do-people-buy-irrelevant-items-in-voice-product-search.pdf>, 2020, pp. 79-87.
Moses, Kriz, "Modeling Product Search Relevance in e-Commerce: Home Depot Case Study", [retrieved from the internet on Mar. 13, 2025], <https://towardsdatascience.com/modeling-product-search-relevance-in-e-commerce-home-depot-case-study-8ccb56fbc5ab/>, Jun. 29, 2021, 34 pages.
Pradhan, et al., "Atypical Queries in eCommerce", CIKM '15: Proceedings of the 24th ACM International on Conference on Information and Knowledge Management, Oct. 17, 2015, 4 pages.
Radinsky, et al., "Behavioral dynamics on the web: Learning, modeling, and prediction", ACM Trans. Inf. Syst. 31, 3, Article 16, Jul. 2013, 37 pages.

Sondhi, et al., "A Taxonomy of Queries for E-commerce Search", In The 41st International ACM SIGIR Conference on Research Development in Information Retrieval (SIGIR '18). Association for Computing Machinery, New York, NY, USA,, 2018, pp. 1245-1248.
Su, et al., "User Intent, Behaviour, and Perceived Satisfaction in Product Search", WSDM '18: Proceedings of the Eleventh ACM International Conference on Web Search and Data Mining, 2018, pp. 547-555.
Taei, et al., "Predicting the Relevance of Search Results for E-Commerce Systems", International Journal of Advances in Soft Computing and its Applications, vol. 7, No. 3, [retrieved from the internet on Mar. 13, 2025], <https://www.researchgate.net/publication/286219675_Predicting_the_Relevance_of_Search_Results_for_E-Commerce_Systems>, Nov. 2015, 9 pages.
Tefko, Saracevic, "Relevance: A review of and a framework for the thinking on the notion in information science", JASIST '75: Proceedings of the Eleventh ACM International Conference on Web Search and Data Mining, vol. 26, Issue 6, 1975, pp. 547-555.
Tsagkias, et al., "Challenges and research opportunities in eCommerce search and recommendations", ACM SIGIR Forum. 54, [retrieved from the internet on Mar. 13, 2025], <https://sigir.org/wp-content/uploads/2020/06/p04.pdf>, 2020, 23 pages.
Yang, et al., "Advertising as Information for Ranking E-Commerce Search Listings", Marketing Science, vol. 43, No. 2, May 17, 2023, 44 pages.
Yao, et al., "Learning a Product Relevance Model from Click-Through Data in E-Commerce", Cornell University, arXiv.org, [retrieved from the internet on Mar. 13, 2025], <https://arxiv.org/pdf/2102.07098>, 2021, 10 pages.
Zogb, Toa, "Web Search Engines: Practice and Experience: Content Analysis Query Prcessing Search Log", [retrieved from the internet on Oct. 10, 2024], <https://www.scribd.com/document/546483849/sss>, unknown, 21 pages.

* cited by examiner

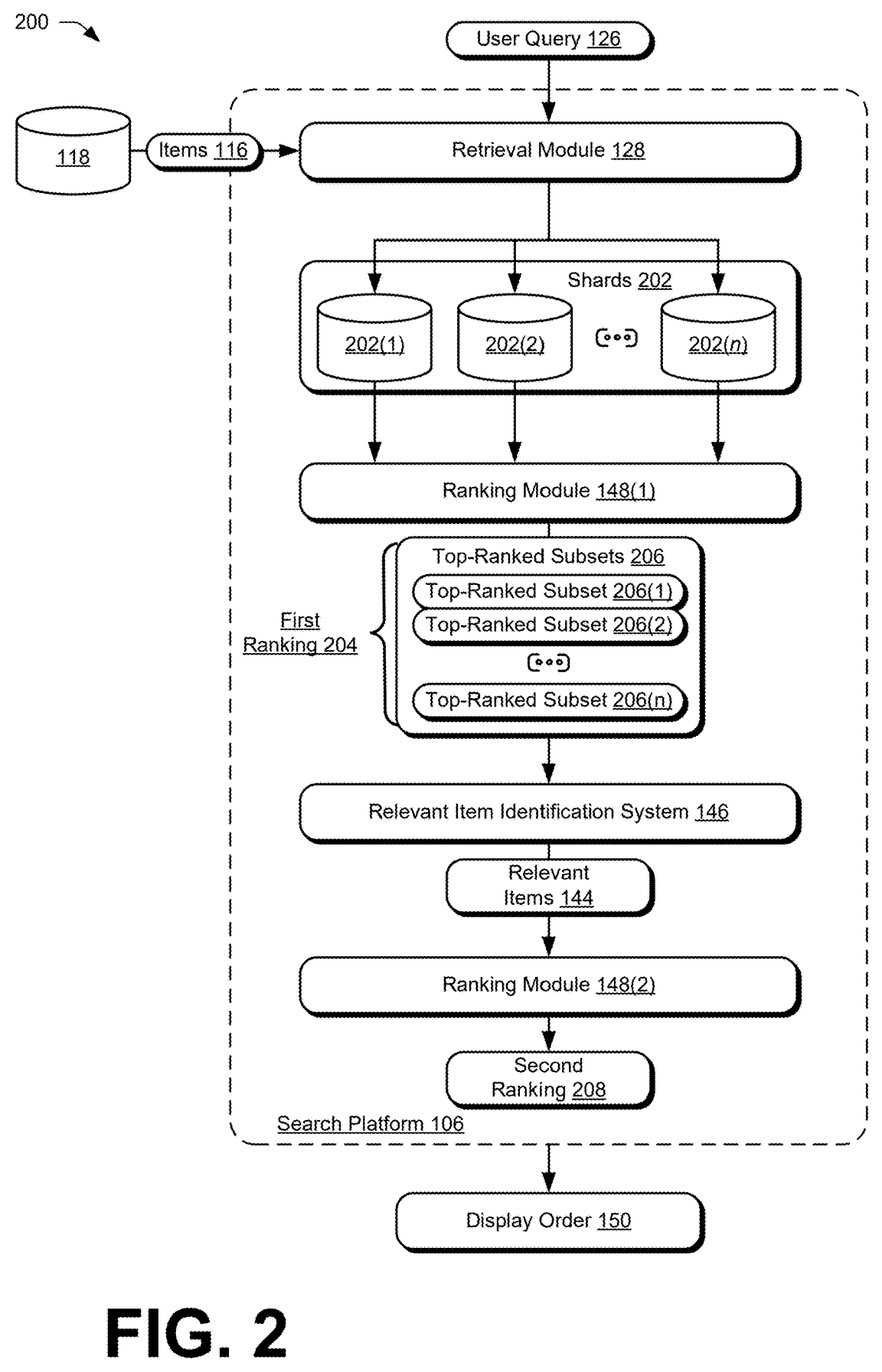

200

User Query 126

118 → Items 116 → Retrieval Module 128

Shards 202

202(1)    202(2)    [•••]    202(n)

Ranking Module 148(1)

First Ranking 204

Top-Ranked Subsets 206
- Top-Ranked Subset 206(1)
- Top-Ranked Subset 206(2)
- [•••]
- Top-Ranked Subset 206(n)

Relevant Item Identification System 146

Relevant Items 144

Ranking Module 148(2)

Second Ranking 208

Search Platform 106

Display Order 150

FIG. 2

500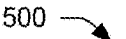

Training Sample 402
Training Query 404
Engagement Items 406
(•••)

Search Platform 106

Query Feature
Extraction Module 134

Query Features 136

First Function 302

Intermediate Relevance
Threshold 304

Relevance Scoring Model 130

Engagement Item 406
Relevance Score 132

(•••)     (•••)

Target Determination Module 410

Minimum Value 412

Training Module 414
Differences 502

Standard Deviation 504

Relaxation
Factor 308

Second Function 306

FIG. 5

600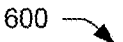

Training Sample 402

Training Query 404

Engagement Items 406

⟨•••⟩

Query Feature
Extraction Module 134

Query Features 136

Contextual Thresholding Model 138

Predicted Relevance
Threshold 602

Relevance Scoring Model 130

⟨•••⟩  Engagement Item 406

Relevance Score 132  ⟨•••⟩

Target Determination
Module 410

Minimum Value 412

Target Reduction Module 604

Delta Value 608

Target Relevance
Threshold 606

Training Module 414

Loss 610

Search Platform 106

Figure 8:
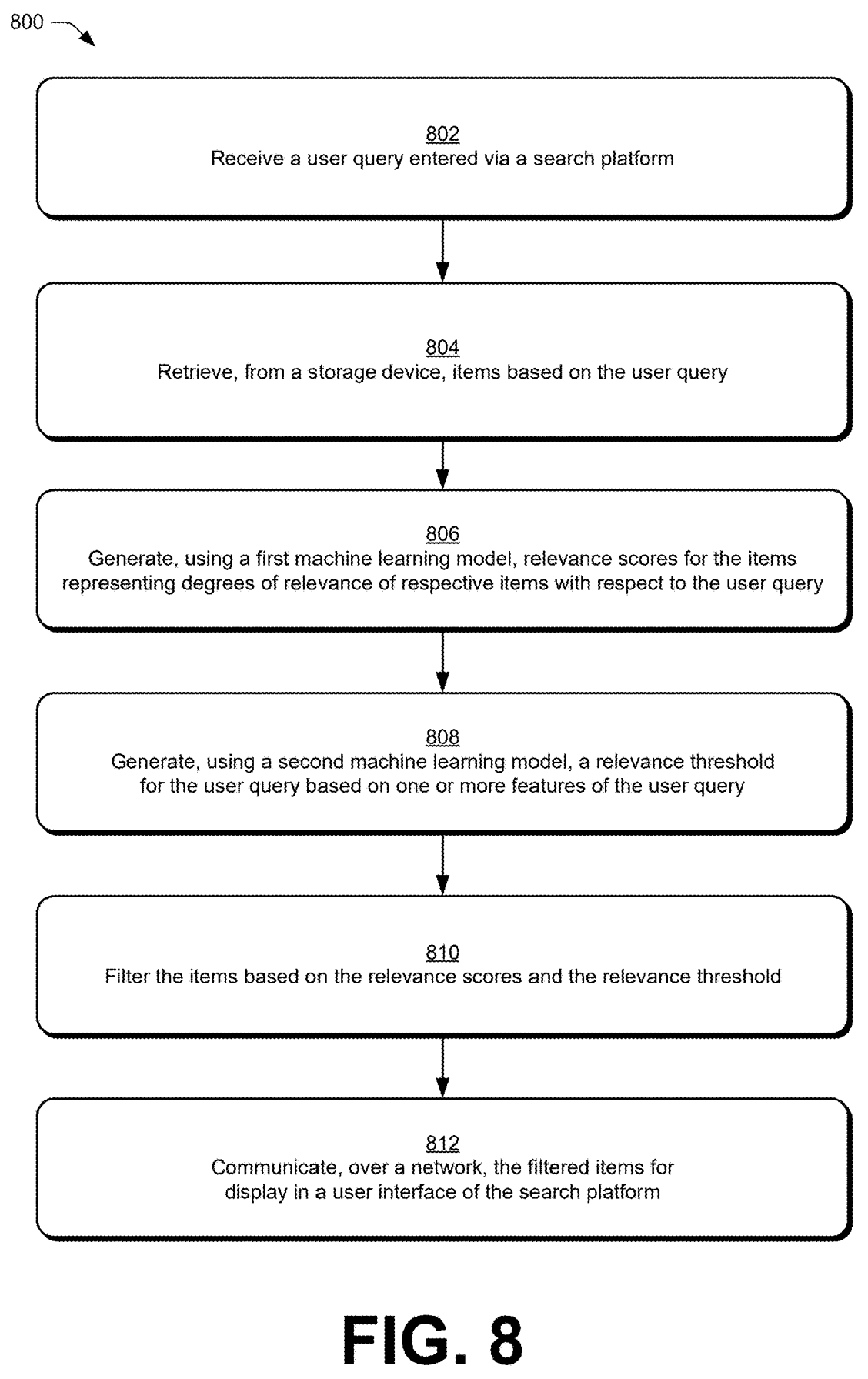

┌─────────────────────────────────────────────────┐
│                      802                         │
│     Receive a user query entered via a search platform │
└─────────────────────────────────────────────────┘
                        │
                        ▼
┌─────────────────────────────────────────────────┐
│                      804                         │
│   Retrieve, from a storage device, items based on the user query │
└─────────────────────────────────────────────────┘
                        │
                        ▼
┌─────────────────────────────────────────────────┐
│                      806                         │
│  Generate, using a first machine learning model, relevance scores for the items │
│ representing degrees of relevance of respective items with respect to the user query │
└─────────────────────────────────────────────────┘
                        │
                        ▼
┌─────────────────────────────────────────────────┐
│                      808                         │
│  Generate, using a second machine learning model, a relevance threshold │
│   for the user query based on one or more features of the user query │
└─────────────────────────────────────────────────┘
                        │
                        ▼
┌─────────────────────────────────────────────────┐
│                      810                         │
│  Filter the items based on the relevance scores and the relevance threshold │
└─────────────────────────────────────────────────┘
                        │
                        ▼
┌─────────────────────────────────────────────────┐
│                      812                         │
│     Communicate, over a network, the filtered items for │
│       display in a user interface of the search platform │
└─────────────────────────────────────────────────┘

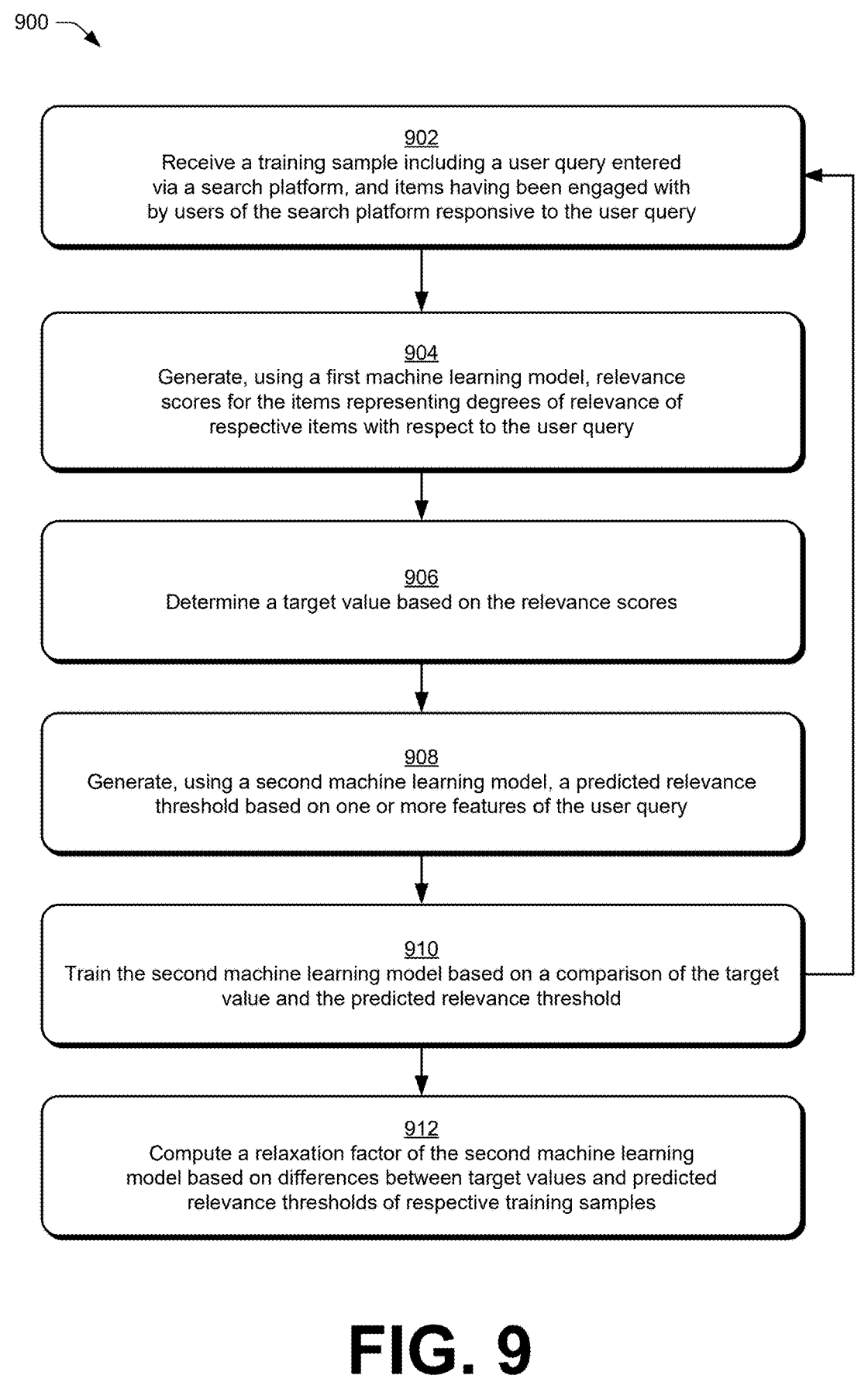

902
Receive a training sample including a user query entered
via a search platform, and items having been engaged with
by users of the search platform responsive to the user query

904
Generate, using a first machine learning model, relevance
scores for the items representing degrees of relevance of
respective items with respect to the user query

906
Determine a target value based on the relevance scores

908
Generate, using a second machine learning model, a predicted relevance
threshold based on one or more features of the user query

910
Train the second machine learning model based on a comparison of the target
value and the predicted relevance threshold

912
Compute a relaxation factor of the second machine learning
model based on differences between target values and predicted
relevance thresholds of respective training samples

FIG. 9

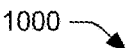
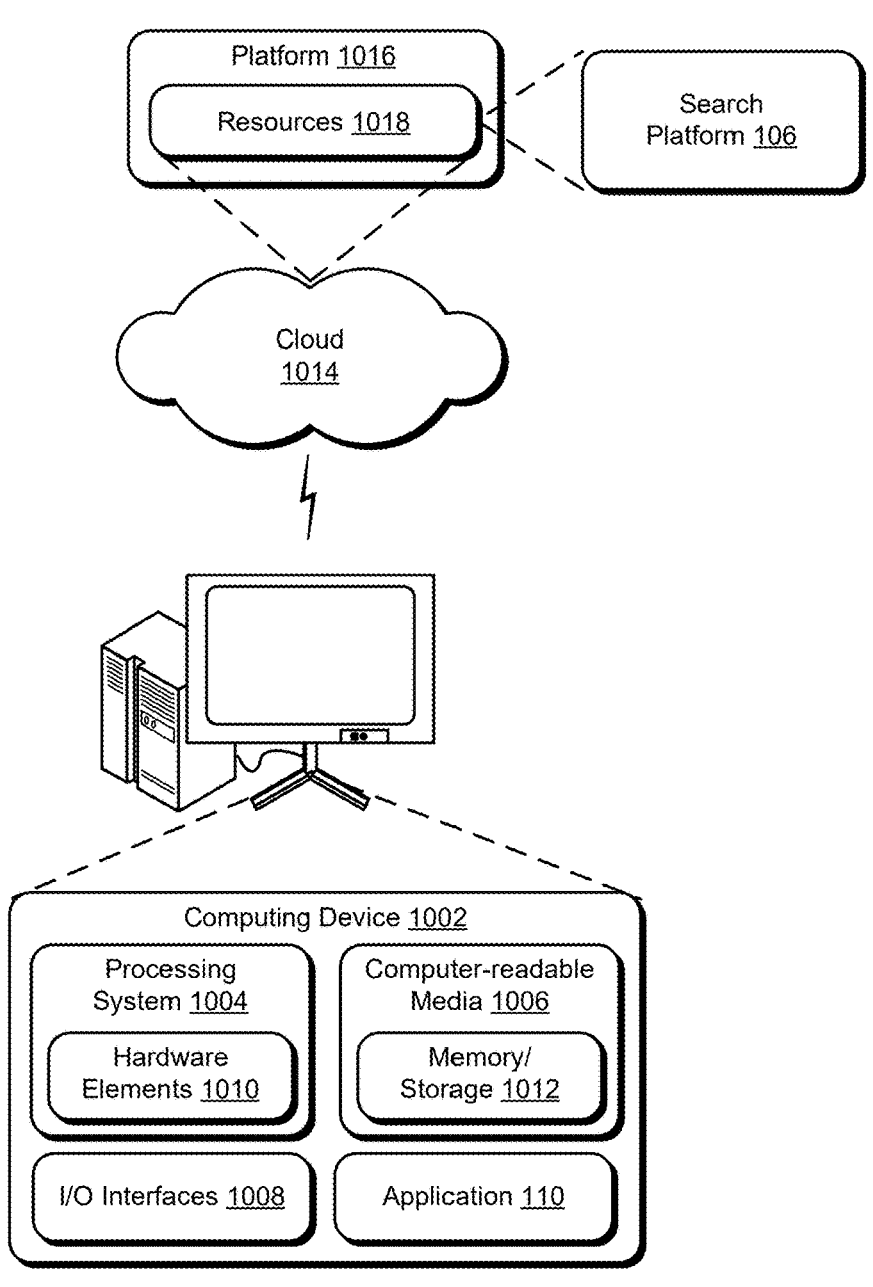
FIG. 10

QUERY DEPENDENT THRESHOLD GENERATION FOR SEARCH RESULT FILTERING

BACKGROUND

Search engines allow users to retrieve relevant information from a dataset by entering user queries, which the search engine matches against indexed content to deliver search results that satisfy the searching user's intent as defined by a user query. To enhance user experience, modern search engines use ranking algorithms to evaluate and prioritize results based on a multitude of factors, one example of which is relevance of search results to the user query. Indeed, search result quality is heavily influenced by whether search results surfaced to a searching user are relevant to the user's query, and accurately reflect the user's searching intent.

SUMMARY

Query dependent threshold generation for search result filtering is described. As part of this, a search platform receives a user query, and retrieves items from a storage device that match the user query. Using a relevance scoring model, the search platform generates relevance scores for the items representing degrees of relevance of respective items with respect to the user query. In addition, the search platform uses the contextual thresholding model to generate a relevance threshold for the user query based on query features of the user query. In various implementations, the query features capture a degree of specificity of the user query. Once the relevance threshold is determined, the search platform filters the retrieved items based on the relevance scores of the retrieved items and the relevance threshold. For example, the search platform filters out (e.g., discards) the items having relevance scores that do not meet the relevance threshold. Furthermore, the search platform communicates the filtered items for display in a user interface of the search platform.

Notably, the contextual thresholding model is trained on a dataset including a plurality of training samples, each having a training query previously entered via the search platform, and engagement items having been engaged with responsive to the training query being entered via the listing platform. In some examples, the contextual thresholding model is trained to generate intermediate relevance thresholds that reflect a minimum value of the relevance scores (e.g., as determined by the relevance scoring model) exhibited by the engagement items, and reduce the intermediate relevance threshold by a learned relaxation factor. Additionally or alternatively, the contextual thresholding model is trained to generate relevance thresholds that reflect a relaxed (e.g., reduced) version of a minimum relevance score (e.g., as determined by the relevance scoring model) exhibited by the engagement items.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

FIG. 2 depicts an example of a search platform determining a display order for search results in accordance with one or more implementations.

FIG. 5 depicts an example of training a second function of a contextual thresholding model in accordance with one or more implementations.

FIG. 6 depicts an example of a search platform training a contextual thresholding model in accordance with one or more implementations.

FIG. 8 depicts a procedure in an example implementation of query dependent threshold generation for search result filtering.

FIG. 9 depicts a procedure in an example implementation of query dependent threshold generation for search result filtering.

FIG. 10 illustrates an example of a system that may implement the various techniques described herein.

DETAILED DESCRIPTION

Overview

Figure 1:
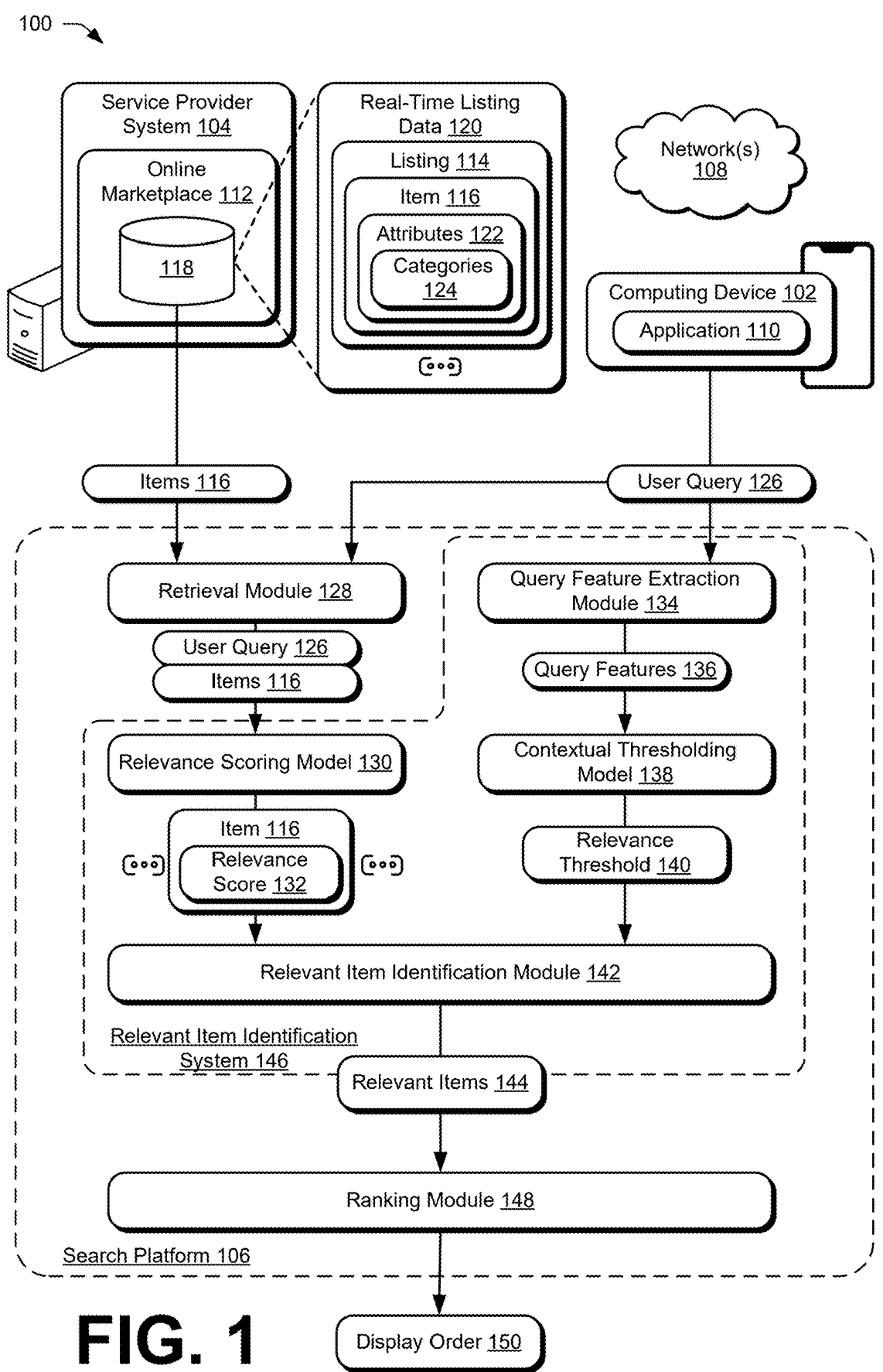
FIG. 1 is an illustration of an environment in an example implementation that is operable to employ techniques described herein.

Search platforms utilize thresholding to filter search results returned responsive to a user query that are irrelevant to a user query. For instance, search platforms filter out search results that fail to meet a minimum quality and/or relevance threshold. However, conventional techniques for threshold-based filtering use predefined thresholds for all user queries entered via a search platform, and as such, fail to account for the nuances, context, and breadth of the user query when crafting the filtering threshold. These conventional approaches, thus, do not consider the notion that a user's desired filtering threshold is dependent on the user query. For example, a user that submits a specific user query (e.g., "size 10 men's athletic shoes") expects search results that are more relevant to the user query than a user that submits a generic user query, e.g., "shoes." Despite this, conventional approaches use a same predetermined relevance threshold for filtering search results of both the specific user query and the generic user query. As a result, the predetermined relevance threshold can be too high for the generic user query (e.g., resulting in acceptable search results being filtered), and too low for the specific user query, e.g., resulting in irrelevant search results being surfaced to the user.

To address these limitations, query dependent threshold generation for search result filtering is described. In contrast to conventional approaches, the described techniques determine different relevance thresholds for different user queries. This is achieved, in part, by using a contextual thresholding model to generate a relevance threshold for a user query based on query features extracted from the user query which capture a degree of specificity of the user query. Thus, rather than using a predetermined relevance threshold for all user queries during search result filtering (as performed by conventional approaches), the described techniques assign different query-specific thresholds to different user queries and perform search result filtering using the query-specific thresholds.

In one or more implementations, the described techniques involve a search platform implemented as part of an online marketplace having a database of listings for items. Further, the listings include real-time listing data describing attributes of the items, such as categories associated with the items. Broadly, the search platform is configured to receive a user query, leverage a contextual thresholding model to determine a query-specific relevance threshold for the user query, and filter search results (e.g., items listed via the online marketplace) for display to a searching user.

As part of this, the contextual thresholding model is trained to determine, given an input query, a query-specific threshold that represents a minimum value of relevance for items that users are willing to engage with on the online marketplace. To do so, a training dataset is collected and/or formulated, and the training dataset includes a plurality of training samples. Each training sample includes a training query previously entered by user(s) on the search platform of the online marketplace, and engagement items having been engaged with (e.g., clicked, viewed, purchased, bid on, added to cart, etc.) responsive to the training query being entered.

During a training phase, the training query and the engagement items are provided to a relevance scoring model, which is a machine learning model having been trained to determine relevance scores for items with respect to a user query. In particular, the relevance scoring model outputs, for each engagement item, a relevance score representing a degree of relevance of the engagement item with respect to the training query. Based on the relevance scores assigned to the engagement items, the search platform determines a minimum value of the relevance scores across all engagement items of the training sample. The target relevance threshold is determined by reducing the minimum value by the delta value (e.g., delta value 608 of FIG. 6).

In addition, the search platform is configured to leverage a first function of the contextual thresholding model to determine a predicted intermediate relevance threshold based on the training query. As part of this, the search platform extracts query features from the training query, which in one or more implementations, capture a specificity of the user query. Furthermore, the query features are provided to the first function as input, and the first function outputs the predicted intermediate relevance threshold. Here, the search platform computes a loss based on a difference between the predicted intermediate relevance threshold and the minimum value, and updates parameters of the first function to reduce the loss. This process is repeated on other training samples until the loss converges to a minimum, a threshold number of training samples have been processed, or a threshold number of epochs have been processed. As a result, the first function learns to associate the query features of a user query with an intermediate relevance threshold that corresponds to a predicted minimum relevance score of items that are engaged with by users responsive to the user query being searched.

After the first function is trained, a plurality of training samples are processed and/or re-processed by the search platform. The result of processing a training sample is a difference between an intermediate relevance threshold computed for the training query of the training sample using the trained first function, and a minimum value of the relevance scores computed for the engagement items of the training sample. This process is repeated to generate a plurality of differences, and the search platform generates a relaxation factor based on the plurality of differences. For instance, the relaxation factor is a function of the standard deviation of the differences. Generally, the relaxation factor is a value by which to reduce the intermediate relevance threshold in order to arrive at a final relevance threshold. In one or more implementations, the search platform additionally tunes the relaxation factor using the plurality of training samples.

The search platform and the contextual thresholding model operate similarly during an inference phase. Here, the search platform receives a user query entered via a user interface of the search platform of the online marketplace, and retrieves items that match the user query from the database of the online marketplace. Here, the items retrieved are referred to as the "recall set." Further, the retrieval algorithm used to retrieve the items is optimized for recall, meaning that the retrieval algorithm is configured to retrieve as many items as possible that match the user query even if that means retrieving some irrelevant items. Here, the items in the recall set and the user query are processed by the relevance scoring model to generate, for each retrieved item, a relevance score representing a degree of relevance of the retrieved item with respect to the user query.

In addition, the search platform extracts the query features from the user query, which as previously mentioned, capture a degree of specificity of the user query. Examples of the query features include, but are not limited to, a number of categories associated with the recall set, a number of items in the recall set, a number of tokens in the user query, constraints/filters applied as part of the user query, and one or more categories associated with the user query and/or items in the recall set. Based on the query features, the contextual thresholding model generates a relevance threshold. In particular, the first function of the contextual thresholding model generates an intermediate relevance threshold based on the query features, and the second function determines the relevance threshold by reducing the intermediate relevance threshold by the learned relaxation factor.

The search platform is configured to filter the items based on the relevance scores assigned to the items and the relevance threshold. As part of this, the search platform identifies relevant items from the recall set that meet the relevance threshold, and ranks at least some of the items for display in a display order. In one example, the search platform filters out (e.g., removes) irrelevant items having the relevance scores that do not meet the relevance threshold, and ranks solely the relevant items in the display order. In another example, the search platform filters the items by placing the relevant items above the irrelevant items in the display order. Furthermore, the search platform communicates the filtered items arranged in the display order to a client device for display in a user interface of the search platform of the online marketplace.

Thus, the described techniques relate to determining a query-specific relevance threshold based on the query features that represents a minimum predicted relevance score for items that users are willing to engage with. Furthermore, the described techniques filter retrieved items based on the relevance threshold and relevance scores assigned to the retrieved items. Since the query features capture query specificity, the described techniques are conceptualizable as modeling the relevance threshold based on query specificity. Accordingly, the described techniques improve the quality of search results by discarding irrelevant items that are unlikely to be engaged with and/or demoting the irrelevant items (e.g., to be ranked below the relevant items), while retaining and/or promoting relevant items (e.g., to be ranked above the irrelevant items) that are predicted to be engaged with given the specificity of the user query.

The notion of relaxing the intermediate threshold further improves the quality of search results that are surfaced to a user. Indeed, the first function is modeled to produce outputs that reflect the minimum value. This is based on the concept that there is a minimum degree of relevance for items that users are willing to engage with given a particular user query, and as such, a query-specific relevance threshold correlates with a relevance score of a least relevant item that still received engagement. However, it is acknowledged that users do not engage with every item they find to be relevant. Thus, relaxing the intermediate threshold by the relaxation factor provides a more accurate representation of the true minimum relevance value for items that user are willing to engage with, and prevents filtering items that are both relevant and likely to be engaged with.

In the following discussion, an exemplary environment is first described that may employ the techniques described herein. Examples of implementation details and procedures are then described which may be performed in the exemplary environment as well as other environments. Performance of the exemplary procedures is not limited to the exemplary environment and the exemplary environment is not limited to performance of the exemplary procedures.

Example of an Environment

FIG. 1 is an illustration of an environment 100 in an example implementation that is operable to employ techniques described herein. The environment 100 includes a computing device 102, a service provider system 104, and a search platform 106. In one or more implementations, the computing device 102, the service provider system 104, and the search platform 106 are communicatively coupled, one to another, via network(s) 108. One example of the network(s) 108 is the Internet, although one or more of the computing device 102, the service provider system 104, and the search platform 106 may be communicatively coupled using one or more different connections or different networks in various implementations.

Although the search platform 106 is depicted in the environment 100 as being separate from the computing device 102 and the service provider system 104, in one or more implementations, an entirety or various portions of the search platform 106 are implemented at or by the computing device 102 and/or the service provider system 104. In at least one implementation, for example, at least a portion of the search platform 106 is implemented by an application 110 of the computing device 102 and/or using various resources of the computing device 102, such as hardware resources, an operating system, firmware, and so forth. Alternatively or additionally, at least a portion of the search platform 106 is implemented by resources (e.g., server-based storage, processing, and so on) of the service provider system 104. Alternatively or additionally, at least a portion of the search platform 106 is implemented using a third-party service, such as a web services platform that provides one or more hardware and/or other computing resources to support provision of services by web service providers.

Computing devices that implement the environment 100 are configurable in a variety of ways. A computing device, for instance, is configurable as a desktop computer, a laptop computer, a mobile device (e.g., assuming a handheld configuration such as a tablet or mobile phone), an IoT device, a wearable device (e.g., a smart watch, a ring, or smart glasses), an AR/VR device (e.g., the smart glasses), a server, and so forth. Thus, a computing device ranges from full resource devices with substantial memory and processor resources to low-resource devices with limited memory and/or processing resources. Additionally, although in instances in the following discussion reference is made to a computing device in the singular, a computing device is also representative of a plurality of different devices, such as multiple servers of a server farm or data center utilized to perform operations "over the cloud" as further described in relation to FIG. 7.

In at least one implementation, the application 110 supports communication of data across the network(s) 108, such as between the computing device 102 and the service provider system 104 and/or between the computing device 102 and the search platform 106. By supporting such data communication, the application 110 provides a respective user of the computing device 102 (and users of other computing devices) access to online marketplace 112. For example, the computing device 102 receives data from the service provider system 104. Based on the received data, the application 110 causes various systems of the computing device 102 to output user interfaces of the online marketplace 112, such as by displaying user interfaces via display devices or making accessible voice-based user interfaces.

Through interaction of a user with the computing device 102, the application 110 receives user input via one or more user interfaces of the online marketplace 112 and/or search platform 106. Examples of such input include, but are not limited to, receiving touch input in relation to portions of a displayed user interface, receiving one or more voice commands, receiving typed input (e.g., via a physical or virtual ("soft") keyboard), receiving mouse or stylus input, and so forth. One example of the application 110 is a browser, which is operable to navigate to a website of the online marketplace 112, display pages of the website, facilitate user interaction with web pages of the online marketplace 112's website, and search for listings, items, and/or functionality of the online marketplace 112. Another example of the application 110 is a web-based computer application of the online marketplace 112, such as a mobile application or a desktop application. The application 110 may be configured in different ways, which enable users to interact with their computing devices and by extension perform actions on the online marketplace 112, without departing from the spirit or scope of the techniques described herein.

In one or more implementations, users register with the service provider system 104 to obtain respective user accounts with the online marketplace 112. Such registration may include, for instance, providing an email address and establishing a username and password combination. Subsequent to registering with the service provider system 104, computing devices (e.g., the computing device 102) facilitate signing into, or otherwise authenticating to, the user account in various ways, such as by receiving a username and matching password, receiving biometric information (e.g., at least one image captured of a face or information captured of another body part such as a thumb or finger) that suitably matches stored biometric information associated with the user account, and so forth. In at least some scenarios, however, the user account via which a user accesses the online marketplace 112 may be a guest account that does not require a user to sign in or otherwise authenticate to an already established account before interacting with the online marketplace 112.

Broadly speaking, the online marketplace 112 is configured to generate listings 114 for items 116 and to expose those listings 114 (e.g., publish them) across the network(s) 108 to one or more computing devices, including to the computing device 102. For example, the online marketplace 112 may generate listings 114 for items 116 for sale and expose those listings to computing devices, such that users of the computing devices can interact with the listings via user interfaces to initiate transactions (e.g., purchases, add to wish lists, share, and so on) in relation to the respective item 116 or items 116 of the listings. In accordance with the described techniques, the items 116 include one or more types of physical goods or property (e.g., clothing and/or clothing accessories, collectibles, furniture, decorative items, textiles, luxury items, electronics, real property, physical computer-readable storage having one or more video games or other digital content stored thereon, and so on), services (e.g., babysitting, dog walking, house cleaning, home repair, general contracting, and so on), digital items (e.g., digital images, digital music, digital videos) that can be downloaded via the network(s) 108, and blockchain backed assets (e.g., non-fungible tokens (NFTs)), to name just a few.

In the illustrated environment 100, the online marketplace 112 includes a storage device 118, which is depicted as maintaining real-time listing data 120. The real-time listing data 120 includes a plurality of listings 114 of the online marketplace 112. The storage device 118 may represent one or more databases and/or other types of storage capable of storing the real-time listing data 120. Examples of the storage device 118 include, but are not limited to, mass storage and virtual storage. In one or more implementations, for example, the storage device 118 may be virtualized across a plurality of data centers and/or cloud-based storage devices. The service provider system 104 may implement the online marketplace 112 by using servers that execute stored instructions to deploy various services of the service provider system 104, such that those services perform numerous computations which are effective to provide the functionality described above and below. It is to be appreciated that the online marketplace 112 may include more, fewer, or different components without departing from the spirit or scope described herein.

In one or more implementations, the online marketplace 112 is accessible by decentralized computing devices that correspond to "clients" of the online marketplace 112, e.g., users that have accounts with the online marketplace 112 and/or that access the online marketplace as a "guest" that is not signed to such an account or tracked as a user with an account. In at least some scenarios, but for the provision of accounts and system guardrails implemented by aspects of the online marketplace 112 (e.g., user interfaces of the application 110), the online marketplace 112 does not generally control actions of the users to use functionality of the online marketplace 112 to list items thereon. For instance, a number (e.g., most) of the users of the online marketplace 112 may not be employed by or otherwise similarly controlled by a company associated with the online marketplace 112. In this way, the users of the online marketplace 112 may exert more control over the items 116 listed with the online marketplace 112 (e.g., the items 116 that those users decide to list through the online marketplace 112) than the company associated with the online marketplace 112 (or its employees or agents).

Users that cause items 116 to be listed on the online marketplace 112 may be referred to as "sellers," whereas users that purchase or otherwise obtain items listed 116 on the online marketplace 112 via its listings may be referred to as "buyers." Sellers and buyers both interact with user interfaces of the online marketplace 112 (e.g., via the application 110) to perform the desired functionality. In addition, an individual user of the online marketplace 112 can interact via the interfaces to be both a seller and a buyer on the online marketplace 112, such as by interacting with the user interfaces to have caused one or more items 116 to be listed on the online marketplace 112 and by interacting with the user interfaces to purchase one or more items 116 from the listings of the online marketplace 112.

A user that is a seller, for instance, may interact with one or more user interfaces of the online marketplace 112 (e.g., output via the application 110) to provide information about one or more items 116 which the user is causing to be listed on the online marketplace 112. Such user interfaces may include prompts that instruct, or guide, users that are sellers to provide various information about items 116 being listed. Examples of information that such interfaces prompt sellers for and that those users provide include, but are not limited to, a title, description (of the item 116), one or more prices (e.g., to purchase the item 116 now and/or a minimum starting bid for the item 116), brand information, size, year, color(s), shipping information (e.g., cost and/or types available), delivery information, return information, payment information, images, videos, models, authenticity information, item history (e.g., chain of custody), and condition (of the item 116), to name a few.

One or more portions of such information may be referred to herein as attributes 122 of the listing 114. For example, a title of the listing 114 may be an attribute 122 of the listing, a description of the item 116 being listed may be an attribute 122 of the listing 114, one or more images uploaded or selected for the listing 114 may be one or more attributes 122 of the listing 114, color(s) of the item 116 may be an attribute 122 of the listing 114, one or more categories 124 of the item 116 may be attributes 122 of the listing 114, and so forth.

In one or more implementations, the categories 124 of the online marketplace 112 include a category hierarchy (e.g., a tree structure) in which more specific child categories 124 (e.g., smartphones) fall under more generic parent categories 124, e.g., electronics. Additionally or alternatively, the categories 124 of the online marketplace 112 include a plurality of sector categories 124 (e.g., sports) each including one or more highest-level or root categories 124 (e.g., sports memorabilia, sporting goods). Given this, the categories 124 associated with a listing 114 for an item 116 can include the categories 124 of the category hierarchy that the item 116 falls under (e.g., from the root category 124 to the lowest-level or leaf category 124), and one or more sector categories 124 to which the item 116 belongs.

In one or more implementations, the online marketplace 112 saves and maintains the input information for a listing 114 in the storage device 118 in fields of a data structure or data record populated for the listing 114, where a given field and the information populated and maintained for the given field correspond to a particular attribute 122 of the listing 114. For instance, a 'title' field of such a data structure or data record may be populated with information (e.g., text) input into a user interface by a seller of a listing 114. The title field and the information input by the user as the title of the listing 114 correspond to an attribute 122 of the listing 114, e.g., a title attribute. In one or more implementations, one or more of the attributes 122 of a listing 114 may be derived and then populated by the online marketplace 112, such as by the online marketplace 112 processing one or more portions of the information input by a user to populate one or more respective attributes of the listing 114.

In accordance with the described techniques, the search platform 106 is representative of functionality for enabling a user of the computing device 102 to search for specific listings 114 on the online marketplace. For example, the application 110 exposes a user interface of the online marketplace 112 for display by the computing device 102. Notably, the search platform 106 is implemented by the online marketplace 112 in various implementations, and as such, the user interface of the online marketplace 112 is synonymous with the user interface of the search platform 106. The user interface, for example, includes user interface elements (e.g., a search bar and selectable search filters) via which the user provides input to specify characteristics of an item 116 that the user desires to view, purchase, bid on, etc. As shown, the search platform 106 receives a user query 126 entered via the user interface of the search platform 106 of the online marketplace 112, e.g., the user query 126 includes text input by the user into the search bar and/or user-selected search filters.

In particular, the user query 126 is provided as input to a retrieval module 128, which is configured to retrieve items 116 that match the user query 126 from the storage device 118. Any one or more of a variety of public or proprietary retrieval techniques are usable by the retrieval module 128 to do so. Examples of such techniques include, but are not limited to, term frequency-inverse document frequency (TF-IDF), latent semantic indexing (LSI), best matching 25 (BM25) algorithms, vector space models (VSMs), embedding-based retrieval models or vector search, nearest neighbor retrieval models, and so on. In various examples, the retrieval module 128 is optimized for recall. This means that the retrieval module 128 is designed to increase a number of retrieved items 116 that match the user query 126, often at the expense of precision. For instance, the retrieval module 128 aims to maximize the number of retrieved items 116 even if that means retrieving some less relevant items 116. The retrieved items 116 are also referred to herein as a "recall set."

As shown, the user query 126 and the retrieved items 116 are provided as input to a relevance scoring model 130. Broadly, the relevance scoring model 130 is a machine learning model having been trained to generate, for each item 116, a relevance score 132 capturing a degree of relevance of the item 116 with respect to the user query 126. A relevance score 132 determined for an item 116, for instance, is a measure of how relevant the item 116 is to the user query 126. Any one or more of a variety of public or proprietary machine learning models are implementable by the relevance scoring model 130, examples of which include learning to rank (LTR) models, bi-directional encoder representations from transformers (BERT) based models (e.g., a MonoBERT model, a DuoBERT model, a ColBERT model, and an MS Marco Sentence-BERT (S-BERT) model), and text-to-text transfer transformer (T5) based models such as a RankT5 model.

In addition, the user query 126 is received by a query feature extraction module 134, which is representative of extracting query features 136 from the user query 126. In one or more implementations, the query features 136 capture a degree of specificity of the user query 126. A more specific user query, for instance, contains focused keywords, exact terms, or clear qualifiers that narrow down the results to a smaller, more relevant set of information, e.g., "size 10 men's athletic running shoe." In contrast, a less specific (or more general) user query is a broad, general search query with reduced detail or context, resulting in a wide range of potential matches, e.g., "shoes." In some examples, the query features 136 include a number of different categories 124 associated with the retrieved items 116, a number of the retrieved items 116 (e.g., a number of items 116 in the recall set), and a number of tokens (e.g., words) in the user query 126.

Additionally or alternatively, the query features 136 include a degree of specificity of tokens, phrases, and expressed intents in the user query 126, e.g., "long-sleeve t-shirt" represents a higher degree of specificity than "shirt." This information is derivable, in part, from named entities and applied constraints in the user query 126. Named entities are predefined categories of objects identifiable using named entity recognition (NER) techniques, and these categories include brands, products, models, places, and so on. Constraints are filters that limit search results to user-defined criteria, such as price range, size, category 124, model or model number, color, material, gender, condition, and so on. The existence or prevalence of named entities and applied constraints in the user query 126 increases query specificity. Notably, constraints can be applied as part of the text input portion of the user query 126 (e.g., the text input by the user to the search bar of the user interface), or as part of the filter input portion of the user query 126, e.g., the selectable filters of the user interface selected by the user. Indeed, the search platform 106 includes functionality for automatically applying constraints based on the text input portion of the user query 126, e.g., the search platform 106 automatically limits a search for the text input portion of "men's athletic shoes" to the "clothing, shoes, and accessories" category 124. The query features 136 include these automatically applied constraints in certain implementations.

Additionally or alternatively, the query features 136 include one or more categories 124 associated with the user query 126. For example, the category 124 or categories 124 of a user query 126 include a leaf category, root category, and/or sector category of a highest-ranked item 116 retrieved responsive to the user query 126. For example, the items 116 are ranked by a ranking module (e.g., a ranking algorithm) for display in the user interface in a display order, and the highest-ranked item 116 is the item ranked for display in a most prominent position in a user interface, e.g., at the top of the search results page. Additionally or alternatively, the category 124 or categories 124 of a user query 126 include one or more leaf categories, root categories, and/or sector categories exhibited by at least a threshold number or percentage of the retrieved items 116. Indeed, some categories 124 like "luxury goods," "collectables," and "auto parts and accessories" are categories 124 in which users tend to query for exact items they are searching for, as opposed to submitting a query for the purpose of browsing. As such, user queries 126 categorized within these categories 124 have increased levels of query specificity.

In one or more implementations, the user query 126 is processed by a semantic embedding model of the search platform 106, which is a machine learning model having been trained to generate an embedding (e.g., a vector of numbers) of a text input that captures a semantic meaning of the text input. Examples of the semantic embedding models include, but are not limited to, a Word2Vec model, a global vectors for word representation (GloVe) model, and an S-BERT model. In various implementations, the query features 136 include the semantic embedding of the user query 126, as generated by the semantic embedding model.

In implementations, the storage device 118 can include a plurality of user queries 126 having previously been entered via the search platform 106. Each user query 126, for instance, includes categories 124 of items 116 engaged with (e.g., clicked, viewed, purchased, added to cart, bid on, etc.) responsive to the user query 126 being entered via the search platform 106, as well as a frequency or quantity of engagement signals for each of the categories 124. The query features 136 can include these frequently engaged categories 124 (e.g., having a frequency or quantity of engagement signals that exceeds a threshold) for the user query 126. Additionally or alternatively, the query features 136 can include a degree of alignment between the frequently engaged categories 124 and the user query 126 itself. This degree of alignment, for instance, is based on a distance between a semantic embedding of the user query 126 and semantic embeddings of the frequently engaged categories 124, as generated by the semantic embedding model. In yet another example, the query features 136 include a degree of alignment between frequently engaged leaf categories and a particular sector category into which the user query 126 is categorized, e.g., whether the frequently engaged leaf categories 124 fall under or are categorizable within the sector category.

Additionally or alternatively, the query features 136 include trends and/or seasonality of the user query 126, e.g., including trends and/or seasonality of the categories 124 associated with the user query 126, and trends and/or seasonality of items 116 retrieved responsive to the user query 126. For example, trending user queries 126 are user queries 126 that have been entered via the search platform 106 at least a threshold number of times over a predefined previous time interval, or user queries 126 for items 116 or categories 124 that have been engaged with at least a threshold number of times over the predefined previous time interval. Moreover, items 116 or categories 124 are associated with seasons, e.g., snow jackets are associated with the winter season. Given this, a user query 126 for an item 116 or a category 124 is in-season if it is entered during a time frame corresponding to the season associated with the item 116 or category 124. The query features, thus, include an indication of whether the user query 126 is trending, and whether the user query 126 is in-season.

In one or more implementations, the search platform 106 is configured to perform an oracle query, which is a preview query that provides insight into the search results of the user query 126 without running the full user query 126. Examples of data retrieved responsive to an oracle query of the user query 126 include a sampling of representative items (e.g., an oracle subset) of the recall set, and a display order of the oracle subset. It should be noted that one or more of the aforementioned query features 136 are derived from the oracle subset, rather than the entire recall set of the retrieved items 116 in various implementations. For instance, the categories 124 associated with user query 126, the number of categories 124, and the trends and/or seasonality of the user query 126 are derived from the items in oracle subset, and the display order (for purposes of extracting categories 124 of a highest-ranked item) is derived by ranking the items in the oracle subset using the ranking module.

Additionally or alternatively, the query features 136 include environmental context and/or user data of the user submitting the user query 126. By way of example, the environmental context includes time-based contextual factors (e.g., time of day, day of week, month or season of the year), geography-based contextual features (e.g., the country or state in which the user query 126 was made), and/or other environmental factors. The user data includes user preferences associated with a user account on the online marketplace 112 (e.g., of a user) from which the user query 126 was submitted, such as whether the user prefers new or used items 116, whether the user prefers free shipping, whether the user prefers items 116 shipped locally within the user's country of residence, and so on. Thus, the query features 136 include or correspond to any suitable data regarding the user query 126, the user submitting the user query 126, and the context in which the user query 126 was submitted.

As shown, the query features 136 are provided as input to a contextual thresholding model 138, which is a machine learning model having been trained to determine a relevance threshold 140 based on the query features 136. As further discussed below with reference to FIGS. 3-6, for instance, the contextual thresholding model 138 is trained to associate the query features 136 with a relevance threshold 140. Here, the contextual thresholding model 138 is trained to output the relevance threshold 140 which defines a predicted minimum value of the relevance score 132 for the items 116 that users are willing to engage with, e.g., view, click, purchase, bid on, add to cart, etc. Since the query features 136 capture a degree of specificity of the user query 126 in various implementations, the contextual thresholding model 138 is also conceptualizable as associating a degree of query specificity with the relevance threshold 140.

In accordance with the described techniques, the relevance threshold 140 as well as the retrieved items 116 having the assigned relevance scores 132 are received by a relevant item identification module 142. Here, the relevant item identification module 142 is configured to identify relevant items 144 from the retrieved items having the relevance scores 132 that exceed the relevance threshold 140. As shown, the relevance scoring model 130, the query feature extraction module 134, the contextual thresholding model 138, and the relevant item identification module 142 combine to form a relevant item identification system 146. Generally, the relevant item identification system 146 identifies relevant items 144 from the recall set having relevance scores 132 that are above the query-specific relevance threshold 140.

The relevant items 144 are provided to a ranking module 148, which includes or corresponds to a rules-based algorithm or machine learning model configured and/or trained to rank, order, or prioritize the items 116 based on one or more conditioning signals. In various implementations, the conditioning signals include the relevance scores 132, and/or engagement data for the items 116. Examples of the ranking module 148 include, but are not limited to, LTR models, neural models (e.g., deep structured semantic models (DSSMs), deep relevance matching models (DRMMs)), and Transformer-based ranking models, e.g., MonoT5 models, DuoT5 models, BERT-based re-ranker models, and ColBERT models.

In one or more implementations, the ranking module 148 receives the retrieved items 116 (e.g., the entire recall set) including an indication of the relevant items 144. Here, the ranking module 148 ranks the items 116 in the recall set based on the relevance scores 132, engagement data of the items 116, and/or other conditioning signals. Moreover, the ranking module 148 determines a display order 150 based on the ranking of the items 116 and the relevant items 144. For instance, the display order 150 includes the relevant items 144 ordered in accordance with the ranking by the ranking module 148, followed by irrelevant items 116 (e.g., having the relevance scores 132 that are below the relevance threshold 140) ordered in accordance with the ranking by the ranking module 148.

Additionally or alternatively, the search platform 106 filters out (e.g., discards) the irrelevant items 116 having the relevance scores 132 that do not meet the relevance threshold 140. Here, the ranking module 148 solely ranks the relevant items 144, and the display order 150 includes the relevant items 144 ordered as ranked by the ranking module 148. In one or more implementations, the display order 150 is communicated (e.g., over the network(s) 108) for display in a user interface of the computing device 102, e.g., a search results page of the online marketplace 112. Generally, listings 114 of higher-ranked items 116 of the display order 150 are displayed more prominently in the user interface (e.g., towards the top of the user interface and/or in earlier search result pages), and vice versa.

In summary, therefore, the search platform 106 filters the retrieved items 116 based on the relevance scores 132 and the relevance threshold 140. In some implementations, a first filtering policy is implemented by discarding (e.g., filtering out) irrelevant items 116 that do not meet the relevance threshold 140. In other implementations, a second filtering policy is implemented by placing relevant items 144 that meet the relevance threshold 140 above the irrelevant items 116 that do not meet the relevance threshold 140 in a display order 150. In various examples, the search platform 106 includes functionality for selectively implementing the first filtering policy or the second filtering policy based on the number of relevant items 144. For example, if the number of relevant items 144 exceeds a threshold number, then the search platform 106 is configured to implement the first scheduling policy to discard the irrelevant items 116. Contrarily, the search platform 106 is configured to implement the second scheduling policy if the number of relevant items 144 is less than a threshold number.

Thus, the described techniques relate to determining a query-specific relevance threshold 140 based on the query features 136, and the relevance threshold 140 represents a minimum predicted relevance score for items 116 that users are willing to engage with. Moreover, the described techniques filter the items 116 based on the relevance threshold 140 and relevance scores 132 assigned to the items 116. Conventional search result filtering techniques filter search results based on a predefined threshold, thereby failing to account for the nuances, context, and breadth of the user query 126. Indeed, a user that submits a more specific user query (e.g., "size 10 men's athletic shoes") typically expects search results exhibiting higher degrees of relevance to the user query. Contrarily, search results that are less relevant to the user query are acceptable and expected by a user that submits a less specific user query, e.g., "shoes." Predefined filtering thresholds utilized by conventional techniques fail to account for this variance in user-expected item relevance, resulting in acceptable search results being filtered responsive to less specific user queries, and minimally relevant search results being surfaced responsive to more specific user queries.

By generating the query-specific relevance threshold 140 based on the query features 136 that capture query specificity, the described techniques improve search results by filtering the items 116 based on whether the items 116 are predicted to be engaged with given the specificity of the user query 126. Moreover, in implementations in which the first scheduling policy is implemented, the search platform reduces computational resource consumption (network bandwidth, processor resources, and memory resources) by discarding irrelevant items 116, thereby reducing the number of items 116 that the search platform 106 ranks and configures for display. This also reduces the amount of data transmitted to the computing device 102 for display, which reduces search latency, e.g., a time between when a user submits the user query 126 and when the search results are presented in the user interface.

Although examples are described herein in which the search platform 106 is implemented as part of the online marketplace 112, these examples are not to be construed as limiting. Rather, the search platform 106 is implementable in any one or more of a variety of environments, such as social media (e.g., the items 116 are social media posts), general search engines (e.g., the items 116 are webpages), document databases (e.g., the items 116 are articles, documents, records, and the like), image databases (e.g., the items 116 are images), libraries, e.g., the items are books, manuscripts, or other archival materials. Accordingly, the search platform 106 is implementable to filter retrieved search results based on a query-specific relevance threshold in a variety of contexts and environments without departing from the spirit or scope of the described techniques.

Moreover, while the relevant item identification system 146 is depicted and described in FIG. 1 as post-retrieval and pre-ranking (e.g., implemented topologically between the retrieval module 128 and the ranking module 148), this example is not to be construed as limiting. Indeed, the relevant item identification system 146 can be configured to identify the relevant items 144 from a ranked list of items 116 (e.g., as ranked by the ranking module 148) for purposes of filtering the items 116. Additionally or alternatively, as further discussed below with reference to FIG. 2, the relevant item identification system 146 can be an intermediate layer of a ranking system, e.g., topologically situated between two ranking modules 148 or two instances of the ranking module 148.

FIG. 2 depicts an example 200 of a search platform 106 determining a display order 150 for search results in accordance with one or more implementations. In the example 200, the retrieval module 128 receives the user query 126, and retrieves items 116 from the storage device 118 that match the user query 126, in accordance with the described techniques. Notably, the number of retrieved items 116 can be in tens of thousands, hundreds of thousands, or over one million. Accordingly, the items are distributed across a plurality of shards 202 (e.g., database shards of the storage device 118), examples of which include shard 202(1), shard 202(2), through shard 202(n), in which n can be any positive integer. In other words, the described techniques are implementable to save the retrieved items 116 to any number of shards 202. By sharding the retrieved items 116, the described techniques enable distribution of the items 116 across physical servers or nodes of the storage device 118 that host the shards 202, thereby reducing the load on individual servers or nodes, enabling parallel processing operations across the shards 202 and reducing query latency.

Further, the retrieved items 116 are supplied to a first instance of the ranking module 148(1) from the shards 202, which is generally configured to determine a first ranking 204 of the retrieved items 116. To rank the items 116, each respective shard 202 supplies, to the ranking module 148(1), a set of the retrieved items 116 saved to the respective shard 202. By way of example, the ranking module 148(1) receives a first set of the retrieved items 116 saved to a first shard 202(1), a second set of the retrieved items 116 saved to a second shard 202(2), and so on.

Given a set of items 116 saved to a shard 202, for instance, the ranking module 148(1) assigns first ranking scores to the items 116 in the per-shard set, and ranks the items 116 according to the first ranking scores. Further, the ranking module 148(1) identifies a top-ranked subset 206 of the items 116 in the per-shard set, e.g., the one-hundred fifty items in the per-shard set having the highest first ranking scores. This process is repeated to rank each per-shard set of items 116 and identify a top-ranked subset 206 for each shard 202, such as top-ranked subsets 206(1), 206(2), through 206(n). Although not shown, the full set of items (e.g., including the items that are excluded from the top-ranked subsets 206) as re-ordered by the ranking module 206(1) are saved to the corresponding shards 202.

Furthermore, the items 116 in the top-ranked subsets 206 are processed by the relevant item identification system 146 in accordance with the above-described techniques. For instance, the query extraction module 134 extracts the query features 136 from the user query 126, and the contextual thresholding model 138 determines a relevance threshold 140 based on the query features 136. Moreover, the relevance scoring model 130 determines relevance scores 132 for the items 116 in the top-ranked subsets 206 stored at the corresponding shards 202. In addition, the relevant item identification module 142 identifies the relevant items 144 from the top-ranked subsets 206 stored at the corresponding shards 202 that meet the relevance threshold 140. Notably, if there are no items 116 in a top-ranked subset 206 that satisfy the relevance threshold 140 saved, a predefined number of items having the highest relevance score(s) 132 are identified as relevant items 144 for that top-ranked subset 206.

Furthermore, the relevant items 144 are provided as input to a second instance of the ranker module 148(2), which determines a second ranking 208 of the relevant items 144. For example, the ranking module 148(2) assigns second ranking scores to the relevant items 144, and ranks the relevant items 144 according to the second ranking scores. It should be noted that in some implementations, the different instances of the ranking module 148(1), 148(2) are differently trained and/or receive different sets of input data or conditioning signals. For example, the first instance of the ranking module 148(1) is trained and/or prompted to rank the items 116 in a way that emphasizes the relevance scores 132 of the items 116 over the engagement data of the items 116. Contrarily, the second instance of the ranking module 148(2) is trained and/or prompted to rank the items 116 in a way that emphasizes the engagement data of the relevant items 144 over the relevance scores 132 of the items 116.

As shown, the search platform 106 determines and outputs a display order 150 for the items 116. Here, the display order 150 includes the relevant items 144 ordered according to the second ranking 208 (e.g., in descending order of the second ranking scores), followed by the irrelevant items 116 (e.g., included in the top-ranked subsets 206 but having relevance scores 132 below the relevance threshold 140) ordered according to the first ranking 204 (e.g., in descending order of the first ranking scores), followed by items 116 outside the top-ranked subsets 206 ordered according to the first ranking 204.

Although two instances of the ranking module 148 are depicted and described above, this example is not to be construed as limiting. Instead, it is to be appreciated that any number of instances of the ranking module 148 are implementable in accordance with the described techniques to rank the items 116 in any number of ranking "rounds." For example, the search platform 106 includes a sequence (e.g., any number) of ranking modules 148. In this context, a top k number of items 116 output by each previous ranking module 148 in the sequence are re-ranked by each subsequent ranking module 148 in the sequence, e.g., such that k is a different value for each ranking module 148. Further, the relevant item identification system 146 can process the items ranked by one or more of the ranking modules 148 to re-order the ranked items based on the relevance threshold 140.

For example, in a first ranking round, a first ranking module 148 ranks the items 116 in the recall set, and the items are re-ordered based on the relevance threshold 140 such that the relevant items 144 in the recall set are ranked higher than the irrelevant items. Further, in a second ranking round, a second ranking module 148 ranks a top-ranked subset of the items 116, as ranked in the first ranking round. Also in the second ranking round, the items in the top-ranked subset are re-ordered such that the relevant items 144 in the top-ranked subset are ranked higher than the irrelevant items in the top-ranked subset. Here, the display order 150 includes the relevant items 144 in the top-ranked subset, followed by the irrelevant items in the top-ranked subset, followed by the relevant items 144 excluded from the top-ranked subset, followed by the irrelevant items excluded from the top-ranked subset. This process is repeated over any number of ranking rounds.

Moreover, while the re-ranking architecture described above utilizes the relevant item identification system 146 for filtering the items 116, this example is not to be construed as limiting. For example, rather than using the query-specific relevance threshold 140 to filter the items 116, the re-ranking architecture can be adapted to filter the items 116 based on a predetermined relevance threshold, e.g., that is constant for different user queries.

Figure 3:
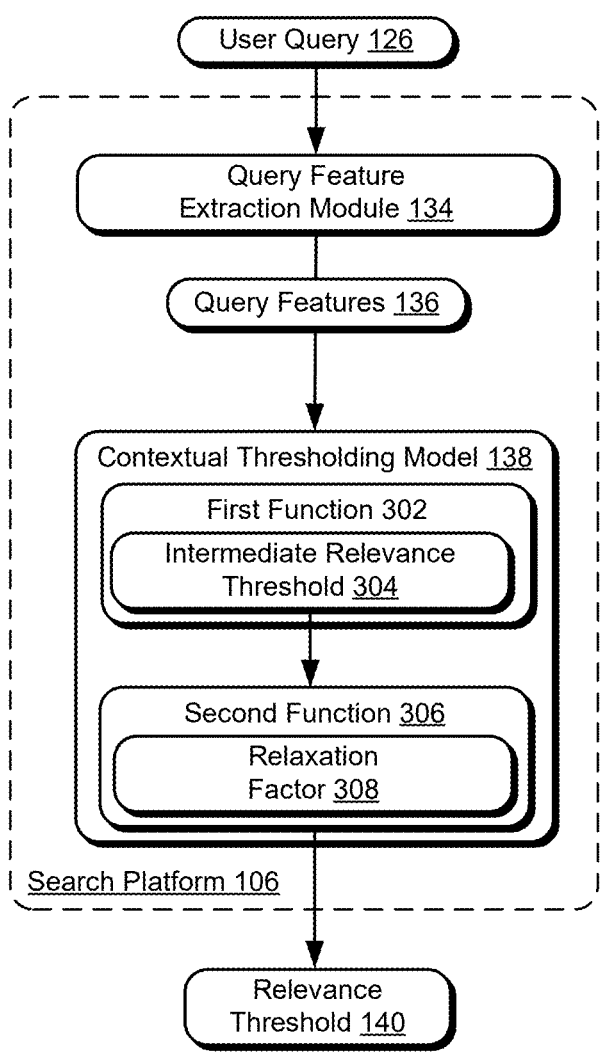
FIG. 3 depicts an example of a contextual thresholding model outputting a relevance threshold in accordance with one or more implementations.

FIG. 3 depicts an example 300 of a contextual thresholding model 138 outputting a relevance threshold 140 in accordance with one or more implementations. In the example 300, the query extraction module 134 receives a user query 126 entered via the search platform 106. Furthermore, the query feature extraction module 134 extracts the query features 136 in accordance with the previously described techniques. In addition, the contextual thresholding model 138 receives the query features 136 as conditioning signals, and generates a relevance threshold 140 based on the query features 136, as previously discussed.

In particular, the contextual thresholding model 138 includes a first function 302 and a second function 306. In general, the first function 302 is a first algorithm (or a first portion) of the contextual thresholding model 138 configured to receive the query features 136 as input, and output an intermediate relevance threshold 304. Moreover, the second function 306 of the contextual thresholding model 138 is a second algorithm (or a second portion) of the contextual thresholding model 138 configured to generate the relevance threshold 140 by reducing the intermediate relevance threshold 304 by a relaxation factor 308. Further details regarding how the first function 302 is trained to associate the query features 136 with the intermediate relevance threshold 304 are provided below with reference to FIG. 4. Further details regarding how the relaxation factor 308 is determined are provided below with reference to FIG. 5.

Figure 4:
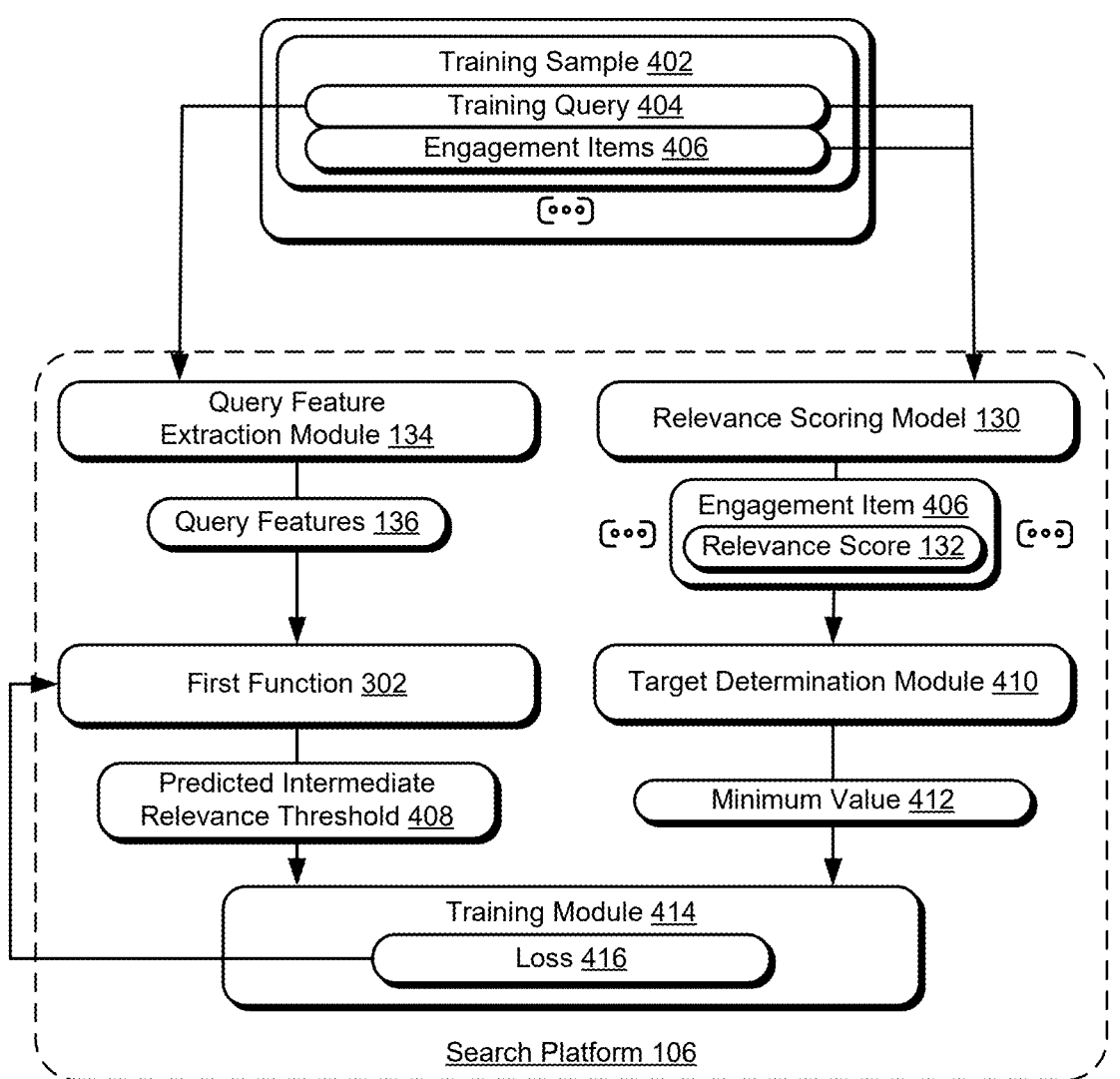
FIG. 4 depicts an example of training a first function of a contextual thresholding model in accordance with one or more implementations.

FIG. 4 depicts an example 400 of training a first function 302 of a contextual thresholding model 138 in accordance with one or more implementations. In other words, the example 400 depicts a first training phase of the contextual thresholding model 138 to train the first function 302 to predict the intermediate relevance threshold 304. As shown, the search platform 106 receives training data including a plurality of training samples 402, and each training sample 402 includes a training query 404 and engagement items 406. The training query 404 of a training sample 402 is a user query having previously been entered via the search platform 106 by user(s) of the search platform 106 and/or online marketplace 112. Furthermore, the engagement items 406 include the items 116 having been engaged with on the search platform 106 and/or online marketplace 112 responsive to the training query 404 being searched.

By way of example, the online marketplace 112 maintains engagement data in the storage device 118 for user queries 126 entered via the search platform 106. The engagement data for a user query 126 includes items retrieved responsive to the training user query 126 (e.g., a recall set of the user query 126), and a ranking of the items, e.g., as determined by the ranking module 148. The ranking captures a display order of the items 116 of the recall set of the user query 126. In addition, the engagement data includes, for each item, an indication of whether the item was engaged with (e.g., viewed, purchased, clicked, bid on, added to cart, etc.) responsive to the user query 126 being searched, along with a quantity of different types of engagement signals.

The engagement items 406 are definable in a variety of ways. In one example, the engagement items 406 include items that have received a click or a purchase responsive to the training query 404 being entered. In another example, the engagement items 406 include items that have received any engagement signal that captures a direct user interaction with the item. For instance, the engagement items 406 include items that have been clicked, purchased, bid on, added to a shopping cart, and/or items that received an offer for purchase responsive to the training query 404 being entered, but exclude items that have solely been viewed responsive to the training query 404 being entered. In yet another example, the engagement items 406 include all items that have been viewed responsive to the training query 404 being entered. As discussed herein, viewed items include all items in the recall set of the training query 404 that are ranked above a deepest click in the display order, e.g., including items that were not directly interacted with. Notably, a "deepest click" refers to a lowest-ranked item in the display order of the recall set of the training query 404 that received a click.

In particular, the training query 404 of a training sample 402 is provided as input to the query feature extraction module 134 which extracts the query features 136 in accordance with the previously described techniques. In addition, the first function 302 receives the query features 136 as conditioning signals, and generates a predicted intermediate relevance threshold 408. Furthermore, the relevance scoring model 130 receives the training query 404 and the engagement items 406 of the training sample 402, and generates a relevance score 132 for each engagement item 406. The relevance scores 132 of FIG. 4 may be referred to as "training relevance scores" as they are generated during a training phase for the purposes of training the first function 302. As discussed above, the relevance score 132 assigned to an engagement item 406 captures a degree of relevance of the engagement item 406 with respect to the training query 404. As shown, the engagement items 406 having the assigned relevance scores 132 are provided to a target determination module 410, which extracts a minimum value 412 of the relevance scores 132.

A training module 414 is depicted as receiving the minimum value 412 and the predicted intermediate relevance threshold 408. The training module 414 is configured to determine a loss 416 (e.g., using a loss function) based, at least in part, on a difference between the minimum value 412 and the predicted intermediate relevance threshold 408. Moreover, the training module 414 updates parameters (e.g., internal weights) of the first function 302 of the contextual thresholding model 138 to reduce the loss 416. Any one or more of a variety of machine learning techniques are employable to train the first function 302, one specific but non-limiting example of which is gradient boosting decision trees (GBDTs). The above-described process is repeated on a plurality of training samples 402 until a threshold number of the training samples 402 have been processed, a threshold number of epochs have been processed, or the loss 416 converges to a minimum. Thus, the first function 302 learns to associate the query features 136 of a user query 126 with an intermediate relevance threshold 304 that corresponds to a predicted minimum relevance score 132 of items that are engaged with by users responsive to the user query 126 being searched.

FIG. 5 depicts an example 500 of training a second function 306 of a contextual thresholding model 138 in accordance with one or more implementations. In other words, the example 500 depicts a second training phase of the contextual thresholding model 138 to determine the relaxation factor 308 of the second function 306. As shown, the search platform 106 receives the plurality of training samples 402. In particular, the training query 404 of a training sample 402 is provided as input to the query feature extraction module 134, which extracts the query features 136 in accordance with the previously described techniques. In addition, the first function 302 (e.g., having been trained in accordance with the techniques discussed above with reference to FIG. 4) receives the query features 136 as conditioning signals, and generates an intermediate relevance threshold 304.

Furthermore, the relevance scoring model 130 receives the training query 404 and the engagement items 406 of the training sample 402, and the relevance scoring model 130 generates a relevance score 132 for each engagement item 406. In accordance with the described techniques, the target determination module 410 identifies a minimum value 412 of the relevance scores 132. The relevance scores 132 of FIG. 5 may be referred to as "training relevance scores" as they are generated during a training phase for the purposes of training the second function 306. Moreover, the training module 414 determines a difference 502 between the intermediate relevance threshold 304 determined for the training sample 402 and the minimum value 412 determined for the training sample 402. This process is repeated on a plurality of training samples 402 to determine a plurality of differences 502.

Next, the training module 414 determines a standard deviation 504 of the differences 502, and sets the relaxation factor 308 to be a function of the standard deviation 504. By way of example, the relaxation factor 308 is defined as:

$$RF = k\sigma$$

In the equation above, RF is the relaxation factor 308, $\sigma$ is the standard deviation 504 of the differences 502, and k is a hyperparameter that is tuned in accordance with a tuning process, as described below.

In accordance with the tuning process, a plurality of training samples 402 are tested (e.g., processed and filtered) in accordance with the described techniques. To test a training sample 402 for the purpose of tuning the hyperparameter, k, for example, the query feature extraction module 134 extracts the query features 136 from a training query 404 of the training sample 402. In addition, the contextual thresholding model 138 generates the relevance threshold 140 using the trained first function 302 and the trained second function 306. In particular, the second function 306 uses the relaxation factor 308 that is based on the standard deviation 504 of the differences 502 and a value of the hyperparameter, k, that is being tested. Furthermore, the relevant item identification module 142 identifies the relevant items 144 (e.g., from the engagement items 406 of the training sample 402) that meet the relevance threshold 140. In one or more implementations, the relevant items 144 are retained while irrelevant items having the relevance scores 132 below the relevance threshold 140 are discarded, as previously mentioned. As such, the relevant items 144 are also referred to as retained engagement items 406.

This process is repeated for a plurality of training samples 402 while testing different values of the hyperparameter, k. In each iteration, the training module 414 evaluates the retained relevant items 144 and the relevance scores 132 thereof. Based on this iterative evaluation, the training module 414 selects a value of the hyperparameter, k, that increases the number of retained engagement items 406 and increases the relevance scores 132 of the retained engagement items 406. By way of example, the training module 414 leverages the following optimization function:

$$O = w_1 R + w_2 N$$

In the equation above, R is the average relevance score 132 of the retained engagement items 406, N is the number of retained engagement items 406, and $w_1$ and $w_2$ are weight values. In various examples, the training module 414 is configured to select, as the tuned hyperparameter, k, the value that maximizes O across a plurality (e.g., all) of the training samples 402.

FIG. 6 depicts an example 600 of a search platform 106 training a contextual thresholding model 138 in accordance with one or more implementations. As shown, the search platform 106 receives a training sample 402 including a training query 404 and engagement items 406. In particular, the training query 404 is provided as input to the query feature extraction module 134 which extracts the query features 136 in accordance with the previously described techniques. In addition, the contextual thresholding model 138 receives the query features 136 as conditioning signals, and generates a predicted relevance threshold 602 based on the query features 136, as previously discussed. The relevance scoring model 130 receives the training query 404 and the engagement items 406, and generates a relevance score 132 for each engagement item 406. The relevance scores 132 of FIG. 6 may be referred to as "training relevance scores" as they are generated during a training phase for the purposes of training the contextual thresholding model 138.

As shown, the engagement items 406 having the assigned relevance scores 132 are provided to the target determination module 410, which determines a minimum value 412 of the relevance scores 132 assigned to the engagement items 406. The minimum value 412 is provided to a target reduction module 604, which is configured to determine a target relevance threshold 606 by reducing (e.g., relaxing) the minimum value 412 by a delta value 608. The delta value 608 is determinable in a variety of ways. In one example, the delta value 608 is a function of the standard deviation of the relevance scores 132 assigned to the engagement items 406.

In one or more implementations, the target determination module 410 determines differences between the minimum value 412 and the relevance scores 132 assigned to the engagement items 406 of the training sample 402. Alternatively, the differences are between the minimum value 412 and the relevance scores 132 of a predetermined number (e.g., five hundred) of the engagement items 406 of the training sample 402 having the highest relevance scores 132.

In some examples, the delta value 608 is a function of a standard deviation of these differences.

In yet another example, the delta value 608 is a function of a lower bound of a confidence interval of the differences computed using the following equation:

$$LB = x - z \frac{\sigma}{\sqrt{n}}$$

In the equation above, LB is the lower bound of the confidence interval of the differences, x is the average (mean) of the differences, z is the z-score for the desired confidence level (e.g., 1.96 for 95% confidence), $\sigma$ is the standard deviation of the differences, and n is the number of engagement items 406 for which the differences are determined.

In a further example, the delta value 608 is a function of a fraction distance between a highest relevance score 132 and a lowest relevance score 132 of the relevance scores 132 assigned to the engagement items 406 using the following equation:

$$D = R_{min} + f(R_{max} - R_{min})$$

In the equation above, D is the fraction distance, $R_{min}$ is the lowest relevance score 132 assigned to the engagement items 406, $R_{max}$ is the highest relevance score 132 assigned to the engagement items 406, and f is a predefined fraction or percentage.

To determine the delta value 608, the target reduction module 604 uses either of the following equations:

$$\delta = k\gamma$$

$$\delta = k + D$$

In the equations above, $\gamma$ can be any one of the standard deviation of the relevance scores 132 assigned to the engagement items 406, a standard deviation of the differences between the minimum value 412 and the relevance scores 132 assigned to the engagement items 406 of the training sample 402, or the lower bound of the confidence interval of the differences between the minimum value 412 and the relevance scores 132 assigned to the engagement items 406. Further, D is the fraction distance between a highest relevance score 132 and a lowest relevance score 132 of the relevance scores 132 assigned to the engagement items 406. Moreover, k is a hyperparameter that is tuned in accordance with the tuning process described above with reference to FIG. 5. Furthermore, $\delta$ is the delta value 608.

Here, the target reduction module 604 determines the target relevance threshold 606 by reducing the minimum value 412 by the delta value 608. As shown, the predicted relevance threshold 602 and the target relevance threshold 606 are provided as input to the training module 414. The training module 414 is configured to determine a loss 610 (e.g., using a loss function) based, at least in part, on a difference between the target relevance threshold 606 and the predicted relevance threshold 602. Moreover, the training module 414 updates parameters (e.g., internal weights) of the contextual thresholding model 138 to reduce the loss 610.

Any one or more of a variety of machine learning techniques are employable to train the contextual thresholding model 138, one specific but non-limiting example of which is gradient boosting decision trees (GBDTs). The above-described process is repeated on a plurality of training samples 402 until a threshold number of the training samples 402 have been processed, a threshold number of epochs have been processed, or the loss 610 converges to a minimum. Thus, in the example 600, the contextual thresholding model 138 learns to associate the query features 136 of a user query 126 with a relevance threshold 140 that corresponds to a relaxed (e.g., reduced) minimum relevance score of items that are engaged with by users responsive to the user query 126 being searched.

Accordingly, the search platform 106 includes two relaxation approaches for determining the relevance threshold 140. In accordance with a first relaxation approach (described above with reference to FIGS. 3-5), the contextual thresholding model 138 relaxes the model output directly. That is, the first function 302 is trained during a training phase to produce outputs that reflect the target value (e.g., the minimum value 412) in the training data, e.g., the first function 302 is trained to output, as the intermediate relevance threshold 304, a predicted minimum relevance score 132 of items that will be engaged with. Furthermore, during an inference phase, the model output (e.g., the intermediate relevance threshold 304) is relaxed (e.g., reduced) to generate the relevance threshold 140. In accordance with a second relaxation approach (described above with reference to FIG. 6), the target reduction module 604 relaxes the target value (e.g., the minimum value 412) during the training phase, and the contextual thresholding model 138 is modeled to produce outputs that reflect the relaxed target value.

Notably, the training phase refers to a phase of operation of the search platform 106 and the contextual thresholding model 138 in which the parameters of the contextual thresholding model 138 are updated using the training data, e.g., the plurality of training samples. Furthermore, the inference phase refers to a phase of operation of the search platform 106 and the contextual thresholding model 128 to leverage the trained contextual thresholding model 128 (e.g., having been trained during the training phase) to generate the relevance threshold 140.

Regardless, the described techniques model the relevance threshold 140 based on the minimum value 412 of the relevance scores 132 for items engaged with responsive to the training query 404. This notion is based on the concept that there is a minimum degree of relevance for items 116 that users are willing to engage with given a particular user query, and as such, a query-specific relevance threshold 140 correlates with a relevance score 132 of a least relevant item that still received engagement. Further, the notion of relaxation (e.g., either relaxing the intermediate relevance threshold 304 during the inference phase or relaxing the target/minimum value 412 during the training phase) is based on the concept that users do not engage with every item they find to be relevant. Thus, by training the contextual thresholding model 138 in the manner described, the contextual thresholding model 138 learns to associate the query features 136 (e.g., which capture query specificity) with a relevance threshold 140 that captures a minimum value of relevance for items that users are willing to engage with given a particular user query. Further, by relaxing the intermediate relevance threshold 304 or the target relevance threshold 606, the described techniques reduce instances of filtering relevant items 116 that are likely to be engaged with.

Although examples are described in which the contextual thresholding model 138 is modeled based on the minimum value 412 as the target value, this is not to be construed as limiting. Indeed, different representative values of the relevance scores 132 of the engagement items 406 (e.g., other than the minimum value 412) are usable by the target determination module 410 as the target value. In one example, the target value is a weighted sum of the relevance scores 132 of the engagement items 406 having weights determined based on the display order, e.g., as determined by the ranking module 148. For instance, larger weights are applied to relevance scores 132 of higher ranked engagement items 406, and smaller weights are applied to relevance scores 132 of lower ranked engagement items 406. Additionally or alternatively, the target value is an average (e.g., mean, median, or mode) of the relevance scores 132 of the engagement items 406. In various implementations, these target values are greater than the minimum value 412, and as such, the hyperparameter can be tuned to reduce these target values to a greater degree as compared to the minimum value 412, e.g., to avoid filtering relevant items that are likely to be engaged with.

Figure 7:
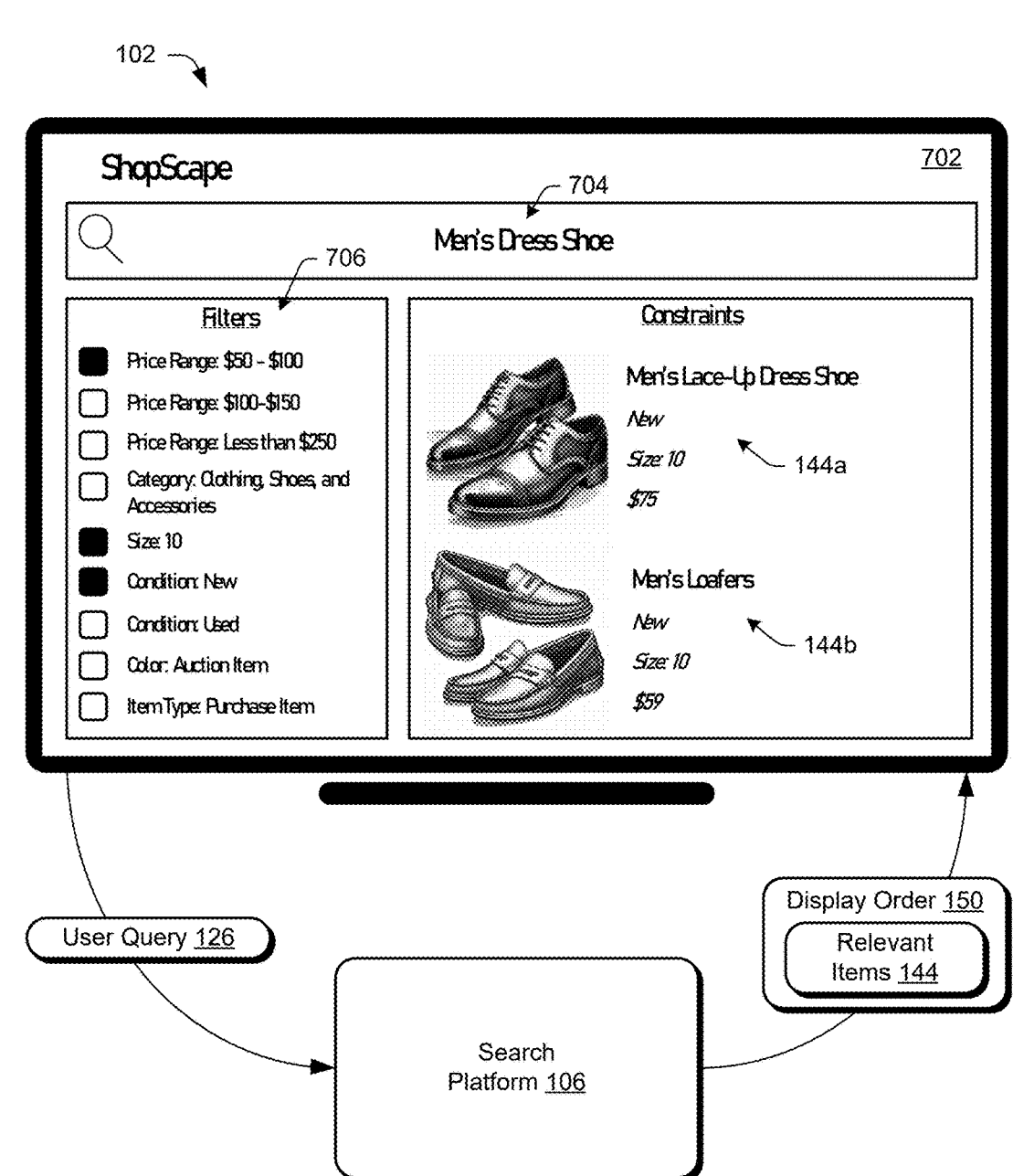
FIG. 7 depicts an example of a user interface displayable in accordance with the described techniques.

FIG. 7 depicts an example 700 of a user interface 702 displayable in accordance with the described techniques. In particular, the example 700 includes the computing device 102 (e.g., a client device) displaying a user interface of the online marketplace 112 and/or search platform 106. Here, user input is provided to the user interface 702 specifying a user query 126. The user query 126 includes a text input portion 704 (e.g., "Men's Dress Shoes") entered via a search bar of the user interface 702, and a filter input portion 706 including user-selected filters (e.g., "Price Range: $50-$100," "Size: 10," and "Condition: New") of the user interface 702.

Here, the user query 126 is communicated to the search platform 106. In this example, the search platform 106 is implemented remotely to the computing device 102, e.g., as part of a web services platform and/or the service provider system 104. Accordingly, the computing device 102 communicates the user query 126 over the network(s) 108 to the search platform 106.

In accordance with the described techniques, the search platform 106 processes the user query 126 to retrieve the items 116, determine the relevance scores 132 for the items 116, determine the relevance threshold 140, and filter the items 116 based on the relevance scores 132 and the relevance threshold 140. As previously mentioned, the relevance threshold 140 is determined based on query features 136 that are derived from the text input portion 704 and/or the filter input portion 706. In this example 700, the search platform 106 filters the retrieved items by filtering out (e.g., discarding) irrelevant items having the relevance scores 132 that are below the relevance threshold 140. Furthermore, the search platform 106 leverages the ranking module 148 to rank the relevant items 144 in a display order 150 in accordance with the described techniques.

As shown, the search platform 106 communicates the relevant items 144 arranged in the display order 150 back to the computing device 102. In response, the computing device 102 displays a search results page in the user interface 702. As shown, the search results page includes listings 114 for the relevant items 144a, 144b, e.g., and excludes irrelevant items. Moreover, the relevant items 144a, 144 are arranged in the display order in which the relevant item 144a is displayed in a more prominent position in the user interface 702 than the relevant item 144b, e.g., the relevant item 144a is ranked higher than the relevant item 144b by the ranking module 148.

Example Procedures

This section describes examples of procedures for query dependent threshold generation for search result filtering. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks.

FIG. 8 depicts a procedure 800 in an example implementation of query dependent threshold generation for search result filtering. A user query entered via a search platform is received (block 802). By way of example, the search platform 106 receives a user query 126 entered via a user interface of the search platform 106. Items are retrieved from a storage device based on the user query (block 804). For example, the retrieval module 128 retrieves items 116 (e.g., a recall set) from the storage device 118 that match the user query 126.

Relevance scores are generated for the items using a first machine learning model, and the relevance scores represent degrees of relevance of respective items with respect to the user query (block 806). By way of example, the relevance scoring model 130 (e.g., the first machine learning model) receives the retrieved items 116 and the user query 126 as input. As output, the relevance scoring model 130 generates, for each item 116, a relevance score 132 capturing a degree of relevance of the item 116 with respect to the user query 126.

A relevance threshold for the user query is generated using a second machine learning model based on one or more features of the user query (block 808). For example, the query feature extraction module 134 extracts query features 136 from the user query 126. In one or more implementations, the query features 136 capture a degree of specificity of the user query 126. For instance, the query features 136 include a number of categories 124 associated with the recall set, a number of items 116 in the recall set, a number of tokens in the user query 126, constraints of the user query 126, and one or more categories 124 associated with the user query 126 and/or items 116 in the recall set. The contextual thresholding model 138 (e.g., the second machine learning model) receives the query features 136 as input, and outputs a relevance threshold 140 based on the query features 136.

The items are filtered based on the relevance scores and the relevance threshold (block 810). By way of example, the relevant item identification module 142 identifies the relevant items 144 from the recall set that meet the relevance threshold 140. In one example, the search platform 106 filters out (e.g., removes) irrelevant items having the relevance scores that do not meet the relevance threshold 140, and the ranking module 148 ranks the relevant items 144 in a display order 150. In another example, ranking module 148 and the search platform 106 filter the items 116 by placing the relevant items 144 above the irrelevant items in the display order 150.

The filtered items are communicated over a network for display in a user interface of the search platform (block 812). For example, the search platform 106 communicates the filtered items to the computing device 102 for display in a user interface of the search platform 106.

FIG. 9 depicts a procedure 900 in an example implementation of query dependent threshold generation for search result filtering. A training sample is received including a user query entered via a search platform, and items having been engaged with by users of the search platform responsive to the user query (block 902). By way of example, the search platform 106 receives a training sample 402 including a training query 404 previously entered by user(s) via the search platform 106, and engagement items 406 engaged with (e.g., clicked, viewed, purchased, bid on, etc.) in response to the training query 404 being entered via the search platform 106.

Relevance scores are generated for the items using a first machine learning model, and the relevance scores represent degrees of relevance of respective items with respect to the user query (block 904). By way of example, the relevance scoring model 130 receives the engagement items 406 and the training query 404 as input. As output, the relevance scoring model 130 (e.g., the first machine learning model) generates, for each engagement item 406, a relevance score 132 capturing a degree of relevance of the engagement item 406 with respect to the training query 404.

A target value is determined based on the relevance scores (block 906). By way of example, the target determination module 410 and/or the target reduction module 604 determine a target value based on the relevance scores 132 of the engagement items 406. In accordance with the first relaxation approach, the target value is the minimum value 412 of the relevance scores 132. In accordance with the second relaxation approach, the target value is the target relevance threshold 606, e.g., the minimum value 412 as relaxed by the delta value 608.

A predicted relevance threshold is generated using a second machine learning model based on one or more features of the user query (block 908). For example, the query feature extraction module 134 extracts query features 136 from the training query 404. In accordance with the first relaxation approach, the first function 302 receives the query features 136 as input, and the first function 302 outputs the predicted intermediate relevance threshold 408. In accordance with the second relaxation approach, the contextual thresholding model 138 (e.g., the second machine learning model) receives the query features 136 as input, and the contextual thresholding model 138 outputs a predicted relevance threshold 602 based on the query features 136.

The second machine learning model is trained based on a comparison of the target value and the predicted relevance threshold (block 910). In accordance with the first relaxation approach, the training module 414 determines a loss 416 (e.g., using a loss function) based, in part, on a difference between the predicted intermediate relevance threshold 408 and the target value, e.g., the minimum value 412. Furthermore, the training module 414 updates parameters (e.g., internal weights) of the first function 302 of the contextual thresholding model 138 to reduce the loss 416. In accordance with the second relaxation approach, the training module 414 determines a loss 610 (e.g., using a loss function) based, in part, on a difference between the predicted relevance threshold 602 and the target value, e.g., the target relevance threshold 606. Further, the training module 414 updates parameters (e.g., internal weights) of the contextual thresholding model 138 to reduce the loss 610. As shown, blocks 902 through 910 are repeated on a plurality of training samples 402, e.g., until a threshold number of training samples or epochs have been processed, or until the loss values converge to a minimum. At this point, the contextual thresholding model 138 is fully trained in accordance with the second relaxation approach, e.g., the second relaxation approach does not perform the operation of block 912.

A relaxation factor of the second machine learning model is computed based on differences between target values and predicted relevance thresholds of respective training samples (block 912). For example, a plurality of training samples 402 are processed and/or re-processed using the trained first function 302. The result of processing a training sample 402 in block 912 is a difference 502 between the intermediate relevance threshold 304 determined for the training query 404 of the training sample 402, and the minimum value 412 of the relevance scores 132 determined for the engagement items 406 of the training sample 402. This processing is repeated over a plurality of training samples 402 to generate a plurality of differences 502. Furthermore, the training module 414 sets the relaxation factor 308 of the second function 306 to be a function of the standard deviation 504 of the differences 502. Finally, the relaxation factor 308 is tuned according to the above-described tuning process on the training data.

Having described examples of procedures in accordance with one or more implementations, consider now an example of a system and device that can be utilized to implement the various techniques described herein.

Example System and Device

FIG. 10 illustrates an example of a system generally at 1000 that includes an example of a computing device 1002 that is representative of one or more computing systems and/or devices that may implement the various techniques described herein. This is illustrated through inclusion of the application 110 and the search platform 106. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1006 is illustrated as including memory/storage 1012. The memory/storage 1012 represents memory/storage capacity associated with one or more computer-readable media. The memory/storage 1012 may include volatile media (such as random-access memory (RAM)) and/or nonvolatile media (such as read only memory (ROM), Flash memory, optical disks, magnetic disks, and so forth). The memory/storage 1012 may include fixed media (e.g., RAM, ROM, a fixed hard drive, and so on)

as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

In some aspects, the techniques described herein relate to a method implemented by at least one computing device, the method including receiving a user query entered via a search platform; retrieving, from a storage device, items based on the user query; generating, using a first machine learning model, relevance scores for the items representing degrees of relevance of respective items with respect to the user query; generating, using a second machine learning model, a relevance threshold for the user query based on one or more features of the user query which capture a degree of specificity of the user query; filtering the items based on the relevance scores and the relevance threshold; and communicating, over a network, the filtered items for display in a user interface of the search platform.

In some aspects, the techniques described herein relate to a method, wherein generating the relevance threshold includes generating, using a first function of the second machine learning model, an intermediate relevance threshold based on the one or more features; and generating, using a second function of the second machine learning model, the relevance threshold by reducing the intermediate relevance threshold by a relaxation factor.

In some aspects, the techniques described herein relate to a method, further including receiving training data including a plurality of training samples, each training sample including a training query, and training items having been engaged with by users of the search platform responsive to the training query; and training the first function and the second function of the second machine learning model using the training data.

In some aspects, the techniques described herein relate to a method, wherein training the first function includes generating, using the first machine learning model, training relevance scores for the training items of a training sample of the plurality of training samples; generating, using the first function, a predicted intermediate relevance threshold based on the one or more features of the training query of the training sample; and training the first function based on a comparison of a target value of the training relevance scores and the predicted intermediate relevance threshold.

In some aspects, the techniques described herein relate to a method, wherein training the second function includes repeating the generating the training relevance scores and the generating the predicted intermediate relevance threshold for each of the plurality of training samples; computing, for each of the plurality of training samples, a difference between the predicted intermediate relevance threshold and the target value; and determining, as the relaxation factor, a function of a standard deviation of the differences.

In some aspects, the techniques described herein relate to a method, wherein the target value is a minimum value of the training relevance scores.

In some aspects, the techniques described herein relate to a method, further including ranking the training items for display in the user interface in a display order, wherein the target value is a weighted sum of the training relevance scores having weights determined based on the display order.

In some aspects, the techniques described herein relate to a method, further including tuning the relaxation factor using the training data.

In some aspects, the techniques described herein relate to a method, wherein the one or more features include a number of the items retrieved based on the user query, a number of categories to which the items belong, a number of tokens in the user query, constraints associated with the user query, and one or more categories into which the user query is classified.

In some aspects, the techniques described herein relate to a method, wherein filtering the items includes identifying relevant items having one or more of the relevance scores that exceed the relevance threshold; ranking the items in a display order for display in the user interface, the display order including the relevant items ranked above irrelevant items having the relevance scores that are below the relevance threshold; and communicating, over the network, the items for display in the user interface in the display order.

In some aspects, the techniques described herein relate to a method, wherein ranking the items includes determining a first ranking of the items, resulting in one or more top-ranked subsets of the items; determining a second ranking of the relevant items in the one or more top-ranked subsets; and determining the display order including the relevant items ordered according to the second ranking, followed by the irrelevant items ordered according to the first ranking, followed by the items outside the one or more top-ranked subsets ordered according to the first ranking.

In some aspects, the techniques described herein relate to a method, wherein filtering the items includes discarding irrelevant items having the relevance scores that are below the relevance threshold.

In some aspects, the techniques described herein relate to a non-transitory computer-readable media storing instructions that, when executed by one or more processors, cause the one or more processors to perform operations including receiving a user query entered via a search platform; retrieving, from a storage device, items based on the user query; generating, using a first machine learning model, relevance scores for the items representing degrees of relevance of respective items with respect to the user query; generating, using a second machine learning model, a relevance threshold for the user query based on one or more features of the user query which capture a degree of specificity of the user query; filtering the items based on the relevance scores and the relevance threshold; and communicating, over a network, the filtered items for display in a user interface of the search platform.

In some aspects, the techniques described herein relate to a non-transitory computer-readable media, the operations further including receiving a training sample including a training query, and training items having been engaged with by users of the search platform responsive to the training query; generating, using the first machine learning model, training relevance scores for the training items; generating, using the second machine learning model, a predicted relevance threshold based on the one or more features of the training query; and training the second machine learning model based on a minimum value of the training relevance scores and the predicted relevance threshold.

In some aspects, the techniques described herein relate to a non-transitory computer-readable media, wherein training the second machine learning model includes determining a delta value based on the training relevance scores; determining a target relevance threshold by reducing the minimum value by the delta value; and training the second machine learning model based on a comparison of the predicted relevance threshold and the target relevance threshold.

In some aspects, the techniques described herein relate to a non-transitory computer-readable media, wherein determining the delta value includes computing, as the delta value, a function of a standard deviation of the training relevance scores.

In some aspects, the techniques described herein relate to a non-transitory computer-readable media, wherein determining the delta value includes determining differences between the minimum value and the training relevance scores; and computing, as the delta value, a function of a standard deviation of the differences.

In some aspects, the techniques described herein relate to a non-transitory computer-readable media, wherein determining the delta value includes determining differences between the minimum value and the training relevance scores; and computing, as the delta value, a function of a lower bound of a confidence interval of the differences.

In some aspects, the techniques described herein relate to a non-transitory computer-readable media, wherein determining the delta value includes computing, as the delta value, a function of a fraction distance between a highest value of the training relevance scores and a lowest value of the training relevance scores.

In some aspects, the techniques described herein relate to a system including one or more processors; and memory storing instructions that, when executed by the one or more processors, cause the system to receive a training sample including a user query entered via a search platform, and items having been engaged with by users of the search platform responsive to the user query; generate, using a first machine learning model, relevance scores for the items representing degrees of relevance of respective items with respect to the user query; determine a target value based on the relevance scores; generate, using a second machine learning model, a predicted relevance threshold based on one or more features of the user query; and training the second machine learning model based on a comparison of the target value and the predicted relevance threshold.

CONCLUSION

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A method implemented by at least one computing device, the method comprising:

receiving a user query entered via a search platform;

retrieving, from a storage device, items based on the user query;

generating, using a first machine learning model, a relevance threshold for the user query based on one or more features of the user query which capture a degree of specificity of the user query;

distributing the items across a plurality of database shards hosted by different servers;

processing, by the different servers, the items in parallel across the plurality of database shards by:

generating, using a second machine learning model, relevance scores for the items representing degrees of relevance of respective items with respect to the user query; and filtering the items based on the relevance scores and the relevance threshold; and communicating, over a network, the filtered items for display in a user interface of the search platform.

2. The method of claim 1, wherein generating the relevance threshold includes:

generating, using a first function of the first machine learning model, an intermediate relevance threshold based on the one or more features; and generating, using a second function of the first machine learning model, the relevance threshold by reducing the intermediate relevance threshold by a relaxation factor.

3. The method of claim 2, further comprising:

receiving training data including a plurality of training samples, each training sample including a training query, and training items having been engaged with by users of the search platform responsive to the training query; and training the first function and the second function of the first machine learning model using the training data.

4. The method of claim 3, wherein training the first function includes:

generating, using the second machine learning model, training relevance scores for the training items of a training sample of the plurality of training samples;

generating, using the first function, a predicted intermediate relevance threshold based on the one or more features of the training query of the training sample; and training the first function based on a comparison of a target value of the training relevance scores and the predicted intermediate relevance threshold.

5. The method of claim 4, wherein training the second function includes:

repeating the generating the training relevance scores and the generating the predicted intermediate relevance threshold for each of the plurality of training samples;

computing, for each of the plurality of training samples, a difference between the predicted intermediate relevance threshold and the target value; and determining, as the relaxation factor, a function of a standard deviation of the differences.

6. The method of claim 4, wherein the target value is a minimum value of the training relevance scores.

7. The method of claim 4, further comprising ranking the training items for display in the user interface in a display order, wherein the target value is a weighted sum of the training relevance scores having weights determined based on the display order.

8. The method of claim 3, further comprising tuning the relaxation factor using the training data.

9. The method of claim 1, wherein the one or more features include a number of the items retrieved based on the user query, a number of categories to which the items belong, a number of tokens in the user query, constraints associated with the user query, and one or more categories into which the user query is classified.

10. The method of claim 1, wherein filtering the items includes:

identifying relevant items having one or more of the relevance scores that exceed the relevance threshold;

ranking the items in a display order for display in the user interface, the display order including the relevant items ranked above irrelevant items having the relevance scores that are below the relevance threshold; and communicating, over the network, the items for display in the user interface in the display order.

11. The method of claim 10, wherein ranking the items includes:

determining a first ranking of the items, resulting in one or more top-ranked subsets of the items;

determining a second ranking of the relevant items in the one or more top-ranked subsets; and determining the display order based on the first ranking and the second ranking.

12. The method of claim 1, wherein filtering the items includes discarding irrelevant items having the relevance scores that are below the relevance threshold.

13. A non-transitory computer-readable media storing instructions that, when executed by one or more processors, cause the one or more processors to perform operations including:

receiving a user query entered via a search platform;

retrieving, from a storage device, items based on the user query;

generating, using a first machine learning model, a relevance threshold for the user query based on one or more features of the user query which capture a degree of specificity of the user query;

distributing the items across a plurality of database shards hosted by different servers;

processing, by the different servers, the items in parallel across the plurality of database shards by:

generating, using a second machine learning model, relevance scores for the items representing degrees of relevance of respective items with respect to the user query; and filtering the items based on the relevance scores and the relevance threshold; and communicating, over a network, the filtered items for display in a user interface of the search platform.

14. The non-transitory computer-readable media of claim 13, the operations further including:

receiving a training sample including a training query, and training items having been engaged with by users of the search platform responsive to the training query;

generating, using the second machine learning model, training relevance scores for the training items;

generating, using the first machine learning model, a predicted relevance threshold based on the one or more features of the training query; and training the first machine learning model based on a minimum value of the training relevance scores and the predicted relevance threshold.

15. The non-transitory computer-readable media of claim 14, wherein training the first machine learning model includes:

determining a delta value based on the training relevance scores;

determining a target relevance threshold by reducing the minimum value by the delta value; and training the first machine learning model based on a comparison of the predicted relevance threshold and the target relevance threshold.

16. The non-transitory computer-readable media of claim 15, wherein determining the delta value includes computing, as the delta value, a function of a standard deviation of the training relevance scores.

17. The non-transitory computer-readable media of claim 15, wherein determining the delta value includes:

determining differences between the minimum value and the training relevance scores; and computing, as the delta value, a function of a standard deviation of the differences.

18. The non-transitory computer-readable media of claim 15, wherein determining the delta value includes:

determining differences between the minimum value and the training relevance scores; and computing, as the delta value, a function of a lower bound of a confidence interval of the differences.

19. The non-transitory computer-readable media of claim 15, wherein determining the delta value includes computing, as the delta value, a function of a fraction distance between a highest value of the training relevance scores and a lowest value of the training relevance scores.

20. A system comprising:

one or more processors; and memory storing instructions that, when executed by the one or more processors, cause the system to:

receive a user query entered via a search platform;

retrieve, from a storage device, items based on the user query;

generate, using a first machine learning model, a relevance threshold for the user query based on one or more features of the user query which capture a degree of specificity of the user query;

distribute the items across a plurality of database shards hosted by different servers;

process, by the different servers, the items in parallel across the plurality of database shards by:

generating, using a second machine learning model, relevance scores for the items representing degrees of relevance of respective items with respect to the user query; and filtering the items based on the relevance scores and the relevance threshold; and communicate, over a network, the filtered items for display in a user interface of the search platform.

* * * * *